United States Patent
Hahn

(10) Patent No.: US 12,103,639 B2
(45) Date of Patent: ***Oct. 1, 2024

(54) BICYCLE CONTROL SYSTEM

(71) Applicant: SRAM, LLC, Chicago, IL (US)

(72) Inventor: Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 639 days.

This patent is subject to a terminal disclaimer.

(21) Appl. No.: 17/338,070

(22) Filed: Jun. 3, 2021

(65) Prior Publication Data

US 2022/0388601 A1    Dec. 8, 2022

(51) Int. Cl.
| | |
|---|---|
| *B62M 9/122* | (2010.01) |
| *B62J 45/41* | (2020.01) |
| *B62M 9/123* | (2010.01) |
| *B62M 9/132* | (2010.01) |
| *B62M 9/133* | (2010.01) |
| *B62M 25/00* | (2006.01) |

(52) U.S. Cl.
CPC ............ *B62M 9/122* (2013.01); *B62J 45/41* (2020.02); *B62M 9/123* (2013.01); *B62M 9/132* (2013.01); *B62M 9/133* (2013.01); *B62M 2025/006* (2013.01)

(58) Field of Classification Search
CPC ...... B62M 9/122; B62M 9/123; B62M 9/132; B62M 9/133; B62M 2025/006; B62J 45/41
See application file for complete search history.

(56) References Cited

U.S. PATENT DOCUMENTS

| | | | | |
|---|---|---|---|---|
| 3,929,025 | A | * 12/1975 | Perry | ............... B62M 9/123 |
| | | | | 474/81 |
| 9,234,580 | B1 | 1/2016 | Usui et al. | |
| 10,507,885 | B2 | 12/2019 | Chen | |
| 2016/0067547 | A1* | 3/2016 | Anthony | ............. G01P 15/0891 |
| | | | | 702/141 |
| 2017/0050702 | A1 | 2/2017 | Grassi | |
| 2017/0334514 | A1 | 11/2017 | Chen et al. | |
| 2018/0105230 | A1 | 4/2018 | Munch | |
| 2018/0111661 | A1* | 4/2018 | Wesling | ................ B62M 9/122 |
| 2020/0171156 | A1* | 6/2020 | Miwa | .................. A61K 31/433 |
| 2020/0283096 | A1* | 9/2020 | Fujimoto | ............... B62M 9/124 |

FOREIGN PATENT DOCUMENTS

| | | |
|---|---|---|
| CN | 1297833 | 6/2001 |
| CN | 104554612 | 4/2015 |
| CN | 107298151 | 10/2017 |

(Continued)

*Primary Examiner* — Edwin A Young

(57) ABSTRACT

A method for controlling electronic shifting of a bicycle includes identifying, by a processor, sensor data. The sensor data identifies a state of the bicycle. The processor determines a rider engagement status based on the identified sensor data. The processor determines a target cadence based on the determined rider engagement status. The processor determines a cadence band based on the determined target cadence. The electronic shifting of the bicycle is controlled based on the determined cadence band. The controlling of the electronic shifting of the bicycle includes actuating a motor of the bicycle for electronic shifting of the bicycle when a cadence of the bicycle is outside of the determined cadence band.

20 Claims, 9 Drawing Sheets

(56) References Cited

FOREIGN PATENT DOCUMENTS

| | | |
|---|---:|---:|
| CN | 111572695 | 8/2020 |
| CN | 111572696 | 8/2020 |
| CN | 111572697 | 8/2020 |
| CN | 112644635 | 4/2021 |
| DE | 102016005211 | 12/2016 |
| DE | 102019108181 | 10/2019 |
| DE | 102020105969 | 9/2020 |
| DE | 102020206490 | 12/2020 |
| EP | 3127799 | 2/2017 |
| EP | 3696073 | 8/2020 |
| TW | 201132550 | 10/2011 |
| TW | 201741196 | 12/2017 |
| TW | I641526 | 11/2018 |
| TW | I660878 | 6/2019 |
| WO | 2015073791 | 5/2015 |
| WO | 2020053760 | 3/2020 |

\* cited by examiner

BICYCLE CONTROL SYSTEM

BACKGROUND

1. Field of the Disclosure

The present disclosure is generally directed to bicycle shifting control, and more particularly, to bicycle shifting control for an electric bicycle.

2. Description of Related Art

A bicycle with a pedal assist electric motor (e.g., an electric bicycle or an ebike) may include wheel speed and crank speed sensors that may be used as inputs to automatic shifting algorithms for a transmission of the bicycle. An automatic shifting algorithm compares the determined cadence to a cadence band and may initiate a shift based on the comparison.

SUMMARY

In one example, a method for controlling electronic shifting of a bicycle includes identifying, by a processor, sensor data. The sensor data identifies a state of the bicycle. The method also includes determining, by the processor, a rider engagement status based on the identified sensor data, and determining, by the processor, a target cadence based on the determined rider engagement status. The method includes determining, by the processor, a cadence band based on the determined target cadence, and controlling the electronic shifting of the bicycle based on the determined cadence band. The controlling of the electronic shifting of the bicycle includes actuating a motor of a derailleur of the bicycle for the electronic shifting of the bicycle when a cadence of the bicycle is outside of the determined cadence band.

In one example, determining the rider engagement status based on the identified sensor data includes determining whether a rider of the bicycle is in a seated position or a standing position based on the identified sensor data. The determined target cadence is higher when the rider of the bicycle is in the seated position compared to when the rider of the bicycle is in the standing position.

In one example, identifying the sensor data includes receiving pressure data from one or more pressure sensors at a seat of the bicycle. Determining whether the rider of the bicycle is in the seated position or the standing position includes determining whether the rider of the bicycle is in the seated position or the standing position based on the received pressure data.

In one example, identifying the sensor data includes receiving torque data from one or more torque sensors of the bicycle. Determining the rider engagement status includes determining a power based on the received torque data, and comparing the determined power to a predetermined power threshold. Determining the target cadence based on the determined rider engagement status includes determining the target cadence based on the comparing.

In one example, the determined target cadence is greater when the determined power is greater than the predetermined power threshold compared to when the determined power is less than the predetermined power threshold.

In one example, determining the rider engagement status further includes identifying, based on the comparing, a high power state when the determined power is greater than the predetermined power threshold. The determined target cadence is a predetermined maximum target cadence when the high power state is identified.

In one example, receiving the torque data from the one or more torque sensors of the bicycle includes receiving the torque data from the one or more torque sensors of the bicycle at a first time interval. Determining the rider engagement status further includes repeating the determining of the power and the comparing at the first time interval or a second time interval. The second time interval is different than the first time interval. Determining the rider engagement status further includes identifying, after the high power state is identified, an end of the high power state based on the comparing over a predetermined period of time. Determining the target cadence based on the determined rider engagement status further includes decreasing the target cadence when the end of the high power state is identified.

In one example, identifying the end of the high power state based on the comparing over the predetermined period of time includes determining, based on the comparing, the determined power is less than the predetermined power threshold at every first time interval over the predetermined period of time.

In one example, the predetermined period of time is a first predetermined period of time. Determining the power based on the received torque data includes determining an average power based on the received torque data from the one or more torque sensors of the bicycle at the first time interval, over a second predetermined period of time.

In one example, the bicycle is an electronic bicycle. The controlling of the electronic shifting of the bicycle further includes actuating an assist motor of the electronic bicycle.

In one example, identifying the sensor data includes receiving the sensor data from one or more sensors of the bicycle. The one or more sensors of the bicycle include an accelerometer, a gyroscope, an inclinometer, a lidar sensor, or any combination thereof. Determining the rider engagement status based on the identified sensor data includes determining an inclination of the bicycle based on the identified sensor data. Determining the target cadence based on the determined rider engagement status includes determining the target cadence based on the determined inclination of the bicycle.

In one example, the determined target cadence is greater when the determined inclination is negative compared to when the determined inclination is positive.

In one example, determining the target cadence based on the determined inclination of the bicycle includes comparing the determined inclination of the bicycle to a lower inclination threshold and an upper inclination threshold, and determining the target cadence based on the comparisons.

In one example, determining the target cadence based on the comparisons includes identifying the target cadence as a first predetermined target cadence when the determined inclination of the bicycle is less than the lower inclination threshold, and identifying the target cadence as a second predetermined cadence when the determined inclination of the bicycle is greater than the upper inclination threshold. The second predetermined target cadence is greater than first predetermined target cadence.

In one example, determining the target cadence based on the comparisons further includes determining, when the determined inclination of the bicycle is greater than the lower inclination threshold and less than the upper inclination threshold, the target cadence using the determined inclination of the bicycle as an input to a linear function between the first predetermined target cadence at the lower inclination threshold and the second predetermined target cadence at the upper inclination threshold.

In one example, identifying the sensor data further includes receiving torque data from one or more torque sensors of the bicycle. Determining the target cadence based on the rider engagement status further includes determining a modifier for the target cadence based on the determined inclination of the bicycle and the received torque data, and determining the target cadence based on the determined modifier and a predetermined target cadence.

In one example, the method further includes determining, by the processor, a torque at a crank arm of the bicycle based on the received torque data. Determining a modifier for the target cadence based on the determined inclination of the bicycle and the received torque data includes determining a first modifier. Determining the first modifier includes comparing the determined inclination to a predetermined inclination band. The predetermined inclination band has an upper inclination limit and a lower inclination limit. Determining the first modifier further includes determining the first modifier based on the comparison of the determined inclination to the predetermined inclination band. Determining the modifier further includes determining a second modifier. Determining the second modifier includes comparing the determined torque at the crank arm of the bicycle to a predetermined torque band. The predetermined torque band has an upper torque limit and a lower torque limit. Determining the second modifier further includes determining the second modifier based on the comparison of the determined torque at the crank arm of the bicycle to the predetermined torque band. Determining the modifier further includes determining the modifier for the target cadence based on the determined first modifier and the determined second modifier.

In one example, determining the modifier for the target cadence based on the determined first modifier and the determined second modifier includes determining a total modifier, comparing the total modifier to a predetermined modifier limit, and based on the comparing of the total modifier to the predetermined modifier limit, identifying the modifier as the predetermined modifier limit when the total modifier is greater than the predetermined modifier limit. The determining of the total modifier includes adding the first modifier and the second modifier.

In one example, a controller for a bicycle includes a memory configured to store a lower inclination limit and an upper inclination limit, and a processor in communication with the memory. The processor is configured to identify sensor data, the sensor data identifying a state of the bicycle. The processor is further configured to determine an inclination of the bicycle based on the identified sensor data, and compare the determined inclination to the stored lower inclination limit and the stored upper inclination limit. The processor is configured to determine a target cadence based on the comparisons, determine a cadence band based on the determined target cadence, and control the electronic shifting of the bicycle based on the determined cadence band. The control of the electronic shifting of the bicycle includes actuation of a motor of a derailleur of the bicycle for the electronic shifting of the bicycle when a cadence of the bicycle is outside of the determined cadence band.

In one example, in a non-transitory computer-readable storage medium that stores instructions executable by one or more processors to control electronic shifting of a bicycle, the instructions include identifying sensor data. The sensor data identifies a state of the bicycle. The instructions further include determining a rider engagement status based on the identified sensor data, and determining a target cadence based on the determined rider engagement status. The instructions include determining a cadence band based on the determined target cadence, and controlling the electronic shifting of the bicycle based on the determined cadence band. The controlling of the electronic shifting of the bicycle includes actuating a motor of a derailleur of the bicycle for the electronic shifting of the bicycle when a cadence of the bicycle is outside of the determined cadence band.

BRIEF DESCRIPTION OF THE DRAWINGS

Objects, features, and advantages of the present invention will become apparent upon reading the following description in conjunction with the drawing figures, in which.

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1:
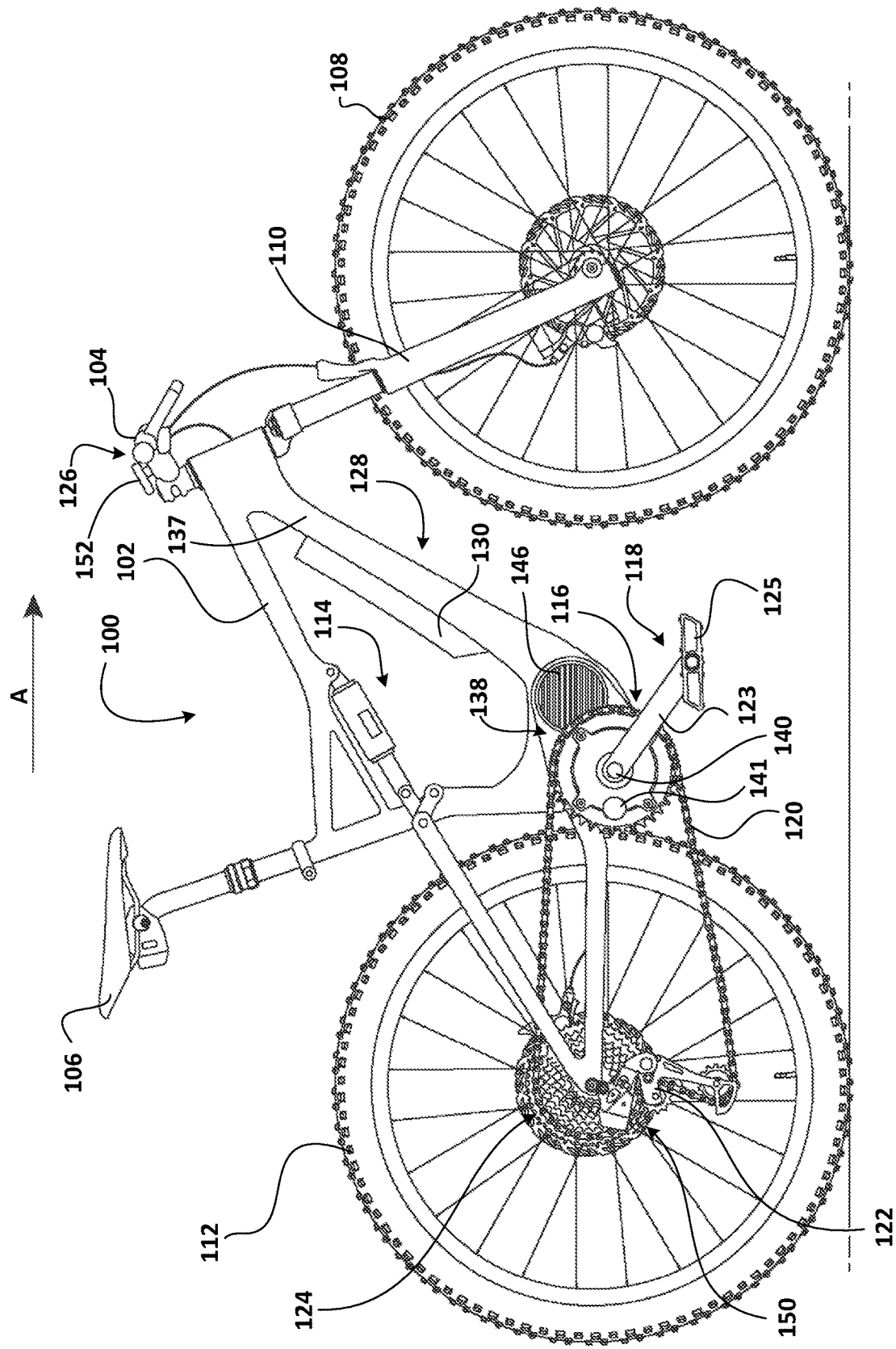
FIG. 1 is a side view of one example of an electric bicycle with automatic shifting that may be controlled in accordance with the teachings of this disclosure.

A bicycle with an electric pedal assist motor capable of driving a chainring independent of cranks (e.g., an ebike) is provided. The bicycle may include crank cadence sensors and/or a power meter. The crank cadence sensors measure crank cadence and provide the measured crank cadence to an electric rear derailleur or a controller of the bicycle. The power meter measures torque generated by a rider and/or power output by the rider (e.g., power input to the bicycle) and provides the measured torque and/or the measured power output to the electric rear derailleur or the controller.

For bicycle transmissions that utilize electronic shifting, as cadence increases, a controller running an automatic shifting algorithm initiates a gear shift. A rider of the bicycle may, however, prefer to pedal at a lower cadence when riding at a leisurely pace and may prefer to pedal at a higher cadence when riding aggressively. Further, the rider of the bicycle may pedal at a higher cadence when seated compared to when standing.

According to the present disclosure, automatic cadence band adjustment is provided based on a sensed riding scenario (e.g., a rider engagement status). The sensed riding scenario may be based on sensor data from one or more sensors of the bicycle. For example, a processor of the electric rear derailleur may receive data related to power input or torque at a crank arm of the bicycle, and the processor may increase a target cadence for the automatic shifting under high power or torque (e.g., greater than 35 Nm) and decrease the target cadence for the automatic shifting under low power or torque (e.g., less than 15 Nm).

As another example, the sensed riding scenario may be whether the rider is seated or standing. When the rider is seated, an increase in power may result in a higher cadence, but when the rider stands, the cadence may decrease with the increased power. The processor of the electric rear derailleur, for example, may receive data from any number of different types of sensors and determine whether the rider is sitting or standing based on the received data. When the processor determines the rider is sitting, the processor may increase the target cadence for the automatic shifting with increasing power, but when the processor determines the rider is standing, the processor may decrease the target cadence for the automatic shifting with the increased power.

As the processor changes the target cadence for the automatic shifting, the processor may also change a cadence band that includes a lower cadence limit and an upper cadence limit. The cadence band may be changed with the changing target cadence such that a range of the cadence band remains the same regardless of the target cadence. Alternatively, different ranges of the cadence band may be provided for different target cadences for the automatic shifting, respectively.

As yet another example, the sensed riding scenario may be a transition from pedaling to coasting and/or a transition from coasting to pedaling. The processor may detect the transition from pedaling to coasting and the transition from coasting back to pedaling based on sensor data from one or more sensors (e.g., a power meter and/or a wheel speed sensor) of the bicycle. The processor may pause changes to the target cadence based on power input or torque at the crank arm of the bicycle, as described above, after the processor detects the transition from pedaling to coasting, and may resume the changing of the target cadence after the processor detects the transition from coasting back to pedaling. Even though the torque on the crank arm is very low during the coasting, by pausing the changes to the target cadence, the target cadence remains the same while the bicycle is coasting.

As another example, the sensed riding scenario may be a technical or high power state (e.g., a technical state). For example, trail riding and riding through rock gardens may involve intermittent pedaling at various torques. Typically, in the technical state, an easy gear that results in a high cadence is desired by the rider. The processor may detect the technical state based on sensor data from one or more sensors of the bicycle. For example, the processor may receive sensor data from the power meter and/or one or more other sensors of the bicycle (e.g., an accelerometer, a gyroscope, and/or a lidar sensor) and determine the bicycle is in the technical state. The processor may set the target cadence to a maximum value when the processor determines the bicycle is in the technical state.

As yet another example, the sensed riding scenario may be an inclination of the bicycle. For example, the bicycle traveling uphill may result in a higher cadence, and the bicycle traveling downhill may result in a lower cadence. The processor may determine the inclination of the bicycle based on sensor data from one or more sensors of the bicycle. For example, the processor may receive sensor data from the power meter and/or one or more other sensors of the bicycle (e.g., an accelerometer and/or a gyroscope) and determine the inclination of the bicycle. The processor may increase a target cadence for the automatic shifting when the determined inclination of the bicycle is positive (e.g., the bicycle is traveling uphill) and decrease the target cadence for the automatic shifting when the determined inclination of the bicycle is negative (e.g., the bicycle is traveling downhill). In one embodiment, the increase of the target cadence is scaled with grade until a maximum target cadence (e.g., 105 RPM) is reached, and the decrease of the target cadence is scaled with grade until a minimum target cadence (e.g., 65 RPM) is reached. In another embodiment, a predetermined positive offset is applied to the target cadence when the determined inclination is negative or is less than a predetermined threshold, and a predetermined negative offset is applied to the target cadence when the determined inclination is positive or is greater than a predetermined threshold.

Changes to the target cadence for automatic shifting described above and below are additive. For example, an adjustment to the target cadence based on input power may be added to an adjustment to the target cadence based on an inclination of the bicycle. In one embodiment, however, there may be a global limit for the additive adjustments to the target cadence for automatic shifting. For example, the added adjustments to the target cadence may not exceed a predetermined limit (e.g., +/−15 RPM).

Unlike automatic shifting of the prior art, in which automatic gear shifting is based only on cadence, in the present disclosure, the target cadence and the corresponding cadence hysteresis band may be changed based on any number of sensed riding scenarios. This helps prevent unwanted shifting of gears and provides for a better riding experience for the rider.

A system control device may be configured so as to be integrated, or coupled, with a bicycle to control bicycle components. The system control device may interface with electromechanically controlled bicycle components so as to trigger an action, such as shifting a rear gear. The system control device may include instructions configured to cause the electromechanically controlled bicycle components to shift between gears automatically (i.e. without specific input or prompting from a rider of the bicycle) based on rider established, or otherwise determined, thresholds, values, parameters, and/or readings from one or more sensors of the bicycle configured to detect characteristics of the bicycle.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms refer to bicycle mechanisms conventionally mounted to a bicycle and with the bicycle orientated and used in a standard fashion unless otherwise indicated.

It is to be understood that the specific arrangement and illustrated components of the frame, front wheel, rear wheel, drivetrain, front brake, rear brake, and saddle are non-limiting to the disclosed embodiments. For example, while the front brake and the rear brake are illustrated as hydraulic disc brakes, hydraulic rim brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof, such as suspension systems, are contemplated and encompassed within the scope of the present disclosure.

Turning now to the drawings, FIG. 1 generally illustrates a bicycle 100 with which one or more system control devices 150 may be used to implement a bicycle control system using the methods described herein. In this example, the bicycle 100 may be a mountain bicycle. In some cases, the bicycle 100 may be an e-bike. The bicycle 100 has a frame 102, a handlebar 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be connected to a rear suspension component 114. The bicycle 100 also has a drive train 116 with a crank assembly 118 that is operatively coupled via a chain 120 and a rear derailleur 122 to a rear cassette 124 near a rotation axis of the rear wheel 112. The crank assembly 118 includes two cranks 123 and two pedals 125 connected to the two cranks 123, respectively, on opposite sides of the frame 102 of the bicycle 100.

In the example shown, the rear derailleur 122 includes a power source (e.g., a battery) and a motor, and receives instructions (e.g., wirelessly) from a controller 126 (e.g., a shifter or a central controller) mounted, for example, to the handlebar 104 or the frame 102 to shift gears on the rear cassette 124. In one embodiment, the rear derailleur 122 receives instructions from an e-bike control system 128 (e.g., including one or more processors, control circuitry, and/or a power source 130; a system control device 150) to shift gears on the rear cassette 124. The rear derailleur 122 shift gears using, for example, the power source and the motor of the rear derailleur 122, based on the received instructions.

In one embodiment, the rear derailleur 122 is powered by a power source outside of the rear derailleur 122. For example, the rear derailleur 122 is powered by the power source 130 (e.g., a battery) of the e-bike control system 128. In another embodiment, the rear derailleur 122 is also connected to an input on the handlebar 104 (e.g., a shifter), for example, via a shifter cable and shifts gears on the rear cassette 124 based on movement of the shifter (e.g., by the rider), and thus the shifter cable.

The battery 130 of the e-bike control system 128 is also supported by the frame 102 of the bicycle 100. For example, the battery 130 of the e-bike control system 128 is supported by a bottom tube 137 of the frame 102 of the bicycle 100. One or more components (e.g., the controller 126) of the bicycle 100 may be coupled with the power source 130 of the e-bike control system 128 via other wires, respectively.

The battery 130, for example, powers a drive unit 138 (e.g., including an e-bike motor) that is operatively coupled to the crank assembly 118. In one embodiment, the drive unit 138 may also be powered by a separate battery to provide access to e-bike controls when the battery 130 of the e-bike control system 128 is not attached to the bicycle 100.

The drive unit 138 is mounted to the frame 102 of the bicycle 100. For example, the drive unit 138 is mounted to the frame 102 of the bicycle 100 with one or more bolts and threaded openings within the frame 102 of the bicycle 100. The drive unit 138 may be attached to the frame 102 in other ways. A crank axle 140 runs through an opening through the drive unit 138 and connects the two cranks 123 of the crank assembly 118. During operation, the rider rotates the two cranks 123 via the two pedals 125, rotating the crank axle 140. The crank assembly 118 and/or the drive unit 138 may include sensors 141 configured to measure axle rotation and forces on the axle 140. At least some of the sensors 141 may, for example, be disposed on and/or within the crank axle 140 and/or at least one of the two cranks 123. The crank axle 140 drives an output ring of the drive unit 138 in a forward drive direction but not in a back pedaling direction through the use of, for example, a one-way clutch between the crank axle 140 and the output ring.

The measured axle rotation and the measured forces on the axle 140 (e.g., by the sensors) may be used to control an electric drive motor 146 (e.g., an assist motor) of the drive unit 138. The assist motor 146 may directly or through the use of gears also drive rotation of the output ring. The output ring thus provides an output power to the drive train 116 that is a combination of rider input power and an output power of the assist motor 146.

While the bicycle 100 depicted in FIG. 1 is a mountain bicycle and may include suspension components, such as a shock absorbing front fork, the specific embodiments and examples disclosed herein as well as alternative embodiments and examples may be implemented on other types of bicycles. For example, the disclosed bicycle shifting control methods may be used on road bicycles, as well as bicycles with mechanical (e.g., cable, hydraulic, pneumatic, etc.) and non-mechanical (e.g., wired, wireless) drive systems. For example, the illustrated handlebar 104 involves an aero-bar configuration; however, the controller 126 and/or bicycle control system may be used with other types of handlebar assemblies as well, such as drop bars, bullhorn bars, riser bars, or any other type of bicycle handlebar. For example the controller 126 may be a lever integrated with a drop bar configuration. Also, while the embodiments described herein describe manual control devices attached to handlebars, a person having experience in the art would recognize the possible positioning of control devices at other areas of a bicycle, such as locations throughout the frame 102 or other locations. The disclosed bicycle shifting control methods may also be implemented on other types of two-, three-, and four-wheeled human powered vehicles as well.

The front and/or forward orientation of the bicycle 100 is indicated by the direction of the arrow "A" in FIG. 1. As such, a forward direction of movement of the bicycle 100 is indicated by the direction of the arrow A.

The drive unit 138 may include internal electronics to control operation of the assist motor 146, measure axle inputs, measure an inclination of the bicycle 100, measure an acceleration of the bicycle 100, measure a temperature of the bicycle 100, and/or reduce a voltage of the battery 130 of the e-bike control system 128 to accommodate and power external devices if lower voltages are required. For example, the internal electronics of the drive unit 138 may include one or more of the sensors 141 (e.g., one or more power meters, cadence sensors, wheel speed sensors, speed sensors, GPS sensors, inclination sensors, direction sensors, seat pressure sensors, mechanical switches, pedal force sensors, accelerometers, gyroscopes, lidar sensors, and/or other sensors). Additional, fewer, and/or different internal electronics may be provided within the drive unit 138. At least one of the sensors 141 may alternatively or additionally be located elsewhere on or in the bicycle 100 (e.g., an accelerometer on or in the rear suspension component 114).

A controller of the drive unit 138 (e.g., an e-bike central control system or controller; a system control device 150) may be disposed on a housing of the drive unit 138 and wired to the internal electronics of the drive unit 138. Alternatively or additionally (e.g., as part of a same housing), the e-bike controller may be supported by a same housing as the power source 130. The e-bike controller may be made of a material through which wireless control signals may pass. In one embodiment, the e-bike controller is wired to the e-bike control system 128.

The e-bike controller may control power from the power source 130 to components on the bicycle 100 such as, for example, the electric drive motor 146 of the drive unit 138. The e-bike controller may control power to other and/or different components on the bicycle 100. The e-bike controller may send signals (e.g., instructions) to and/or receive data (e.g., instructions and/or sensor data) from components on the bicycle 100 such as, for example, the rear derailleur 122, a suspension system, and/or a seat post assembly to actuate and/or control components of the bicycle 100.

In other embodiments, the e-bike controller may be located in other locations (e.g., mounted on the handlebar 104) on the bicycle 100 or, alternatively, may be distributed among various components of the bicycle 100, with routing of a communication link to accommodate necessary signal and power paths. For example, a control unit 152 (e.g., acting as the e-bike controller; a system control device 150) may be mounted to the handlebar 104 for actuating a motor of the rear derailleur 122 and operating the rear derailleur 122 for executing gear changes and gear selection. The control unit 152 and/or the e-bike controller, however, may be located anywhere on the bicycle 100 or, alternatively, may be distributed among various components of the bicycle 100, with routing of a communication link to accommodate necessary signal and power paths. In one example, the e-bike controller may be integrated with the rear derailleur 122 to communicate control commands between components. The control unit 152 and/or the e-bike controller may also be located other than on the bicycle 100, such as, for example, on a rider's wrist or in a jersey pocket. The communication link may include wires, may be wireless, or may be a combination thereof. The control unit 152 and/or the e-bike controller may include a processor, a communication device (e.g. a wireless communication device), a memory, and one or more communication interfaces.

A controller of the rear derailleur 122 and/or the e-bike controller wirelessly actuates a motor module of the rear derailleur 122 and/or the electric drive motor 146 and operates the rear derailleur 122 for executing gear changes and gear selection. Additionally or alternatively, the controller of the rear derailleur 122 and/or the e-bike controller may be configured to control gear shifting of a front gear changer.

Data from the drive unit 138 (e.g., sensors 141 of the drive unit 138) and/or the crank assembly 118 (e.g., sensors 141 of the drive unit 138) may be transmitted to the e-bike controller. The data may be transmitted via one or more wired connections and/or wirelessly. For example, a crank-based power meter generates data representing input torque and/or power applied to one of the cranks 123 and transmits the data to the e-bike controller.

All the communication between the one or more system control devices 150 of the bicycle 100 (e.g., the e-bike control system 128) and each component is achieved through wired or wireless communication. There may be discrete control with individual wires from the respective system control device 150 to each component to be controlled by the respective system control device 150 (e.g., a motor of the rear derailleur 122), or at least one of the system control devices 150 may use a controller area network ("CAN") bus configured to allow microcontrollers and devices to communicate with each other in applications.

Figure 2:
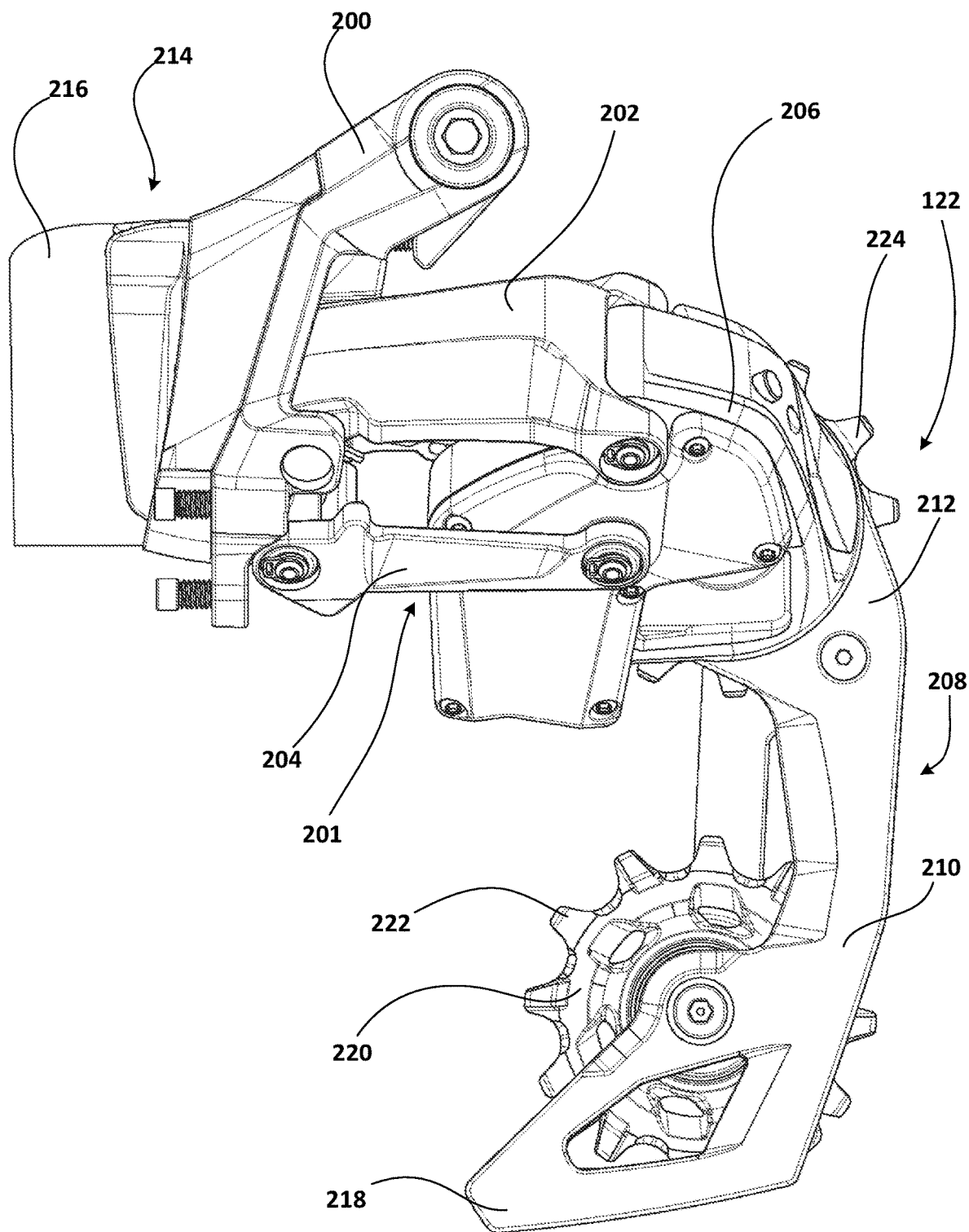
FIG. 2 is a side view of one example of a rear derailleur.

The data transmitted to the system control device 150 may be used for automatic shifting within the methods described herein. Referring to FIG. 2, the rear derailleur 122 is depicted in these examples as a wireless, electrically actuated rear derailleur mountable to the frame 102 of the bicycle 100. The electric rear derailleur 122 has a base member 200 (e.g., a b-knuckle) that is mountable to the frame 102. A linkage 201 has two links, an outer link 202 and an inner link 204, that are pivotally connected to the base member 200. A movable member 206 (e.g., a p-knuckle) is connected to the linkage 201. A chain guide assembly 208 (e.g., a cage) has a cage plate 210 with a proximal end 212 that is pivotally connected to a part of the movable member 206, as described further below.

A motor module 214 is carried on the electric rear derailleur 122 and has a battery 216. The battery 216 supplies power to the motor module 214. In one example, as illustrated in FIG. 2, the motor module 214 is located in the base member 200. However, the motor module 214 may instead be located elsewhere, such as in the outer link 202 or the inner link 204, or in the movable member 206. The motor module 214 may include, though not shown herein, a gear mechanism or transmission. As is known in the art, the motor module 214 and gear mechanism may be coupled with the linkage 201 to laterally move the cage plate 210 and thus switch the chain 120 among the rear sprockets on the rear cassette 124.

The cage plate 210 also has a distal end 218 that carries a tensioner cog or wheel 220 (e.g., a tensioner wheel). The tensioner wheel 220 also has teeth 222 around a circumference. The cage plate 210 is biased in a chain tensioning direction to maintain tension in the chain 120. The chain guide assembly 208 may also include a second cog or wheel, such as a guide wheel 224 disposed nearer the proximal end 212 of the cage plate 210 and the movable member 206. In operation, the chain 120 is routed around a rear sprocket of the rear cassette 124. An upper segment of the chain 120 extends forward to a chainring of the crank assembly 118 and is routed around the chainring. A lower segment of the chain 120 returns from the chainring to the tensioner wheel 220 and is then routed forward to the guide wheel 224. The guide wheel 224 directs the chain 120 to the rear cassette 124. Lateral movement of the cage plate 210, the tensioner wheel 220, and the guide wheel 224 may determine the lateral position of the chain 120 for alignment with a selected rear sprocket of the rear cassette 124.

The battery 216 may instead be an alternate power supply or power source and may operate other electric components of the bicycle 100 within a linked system. The battery 216 or other power supply may also be located in other positions, such as attached to the frame 102. Further, multiple power supplies may be provided, which may collectively or individually power the electric components of the system, including the rear derailleur 122, such as the electric drive motor 146. In this example, however, the battery 216 is configured to be attached directly to the rear derailleur 122, and to provide power only to the components of the rear derailleur 122.

Figure 3:
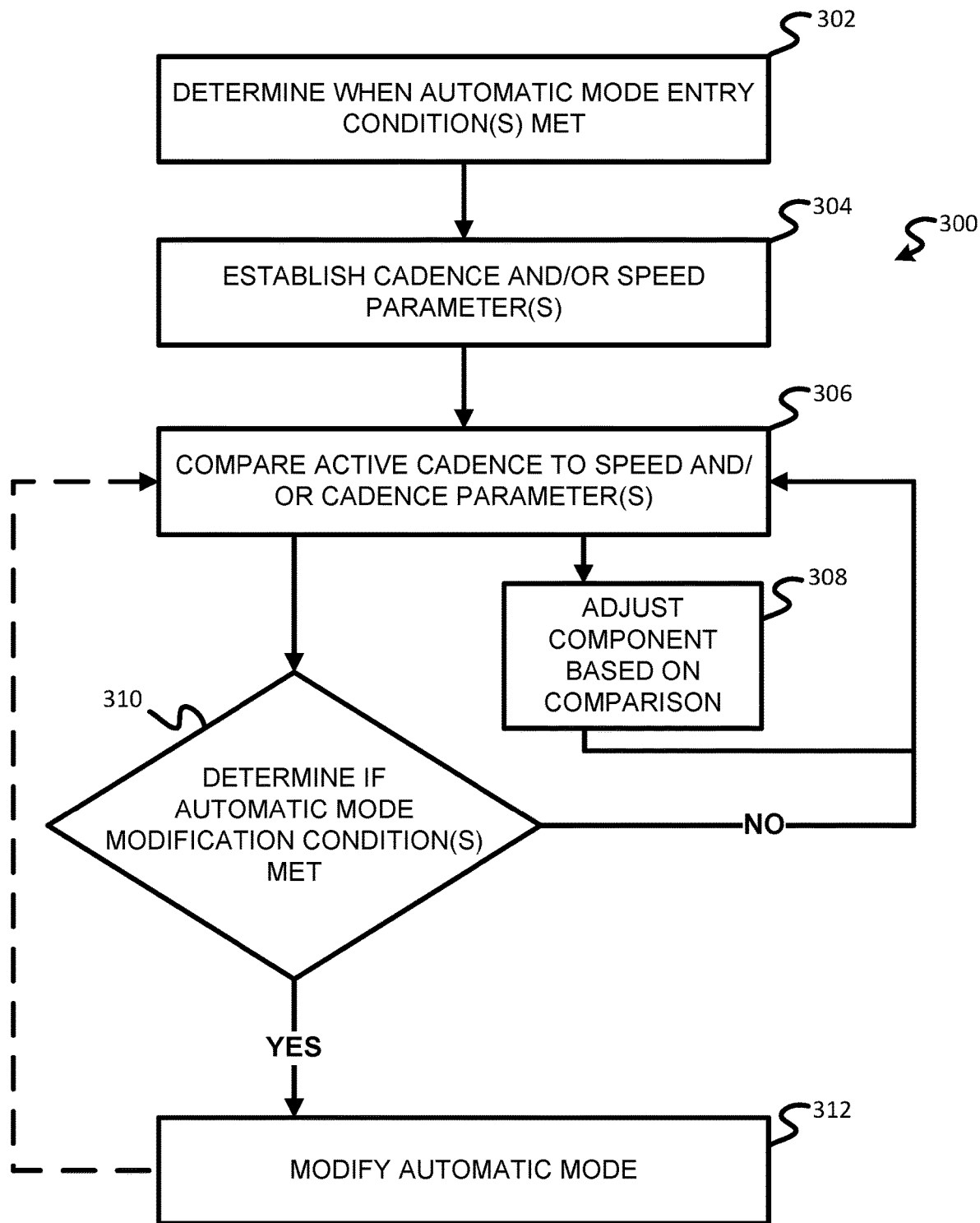
FIG. 3 is a flow chart of an embodiment of a method for controlling a bicycle.
Figure 4:
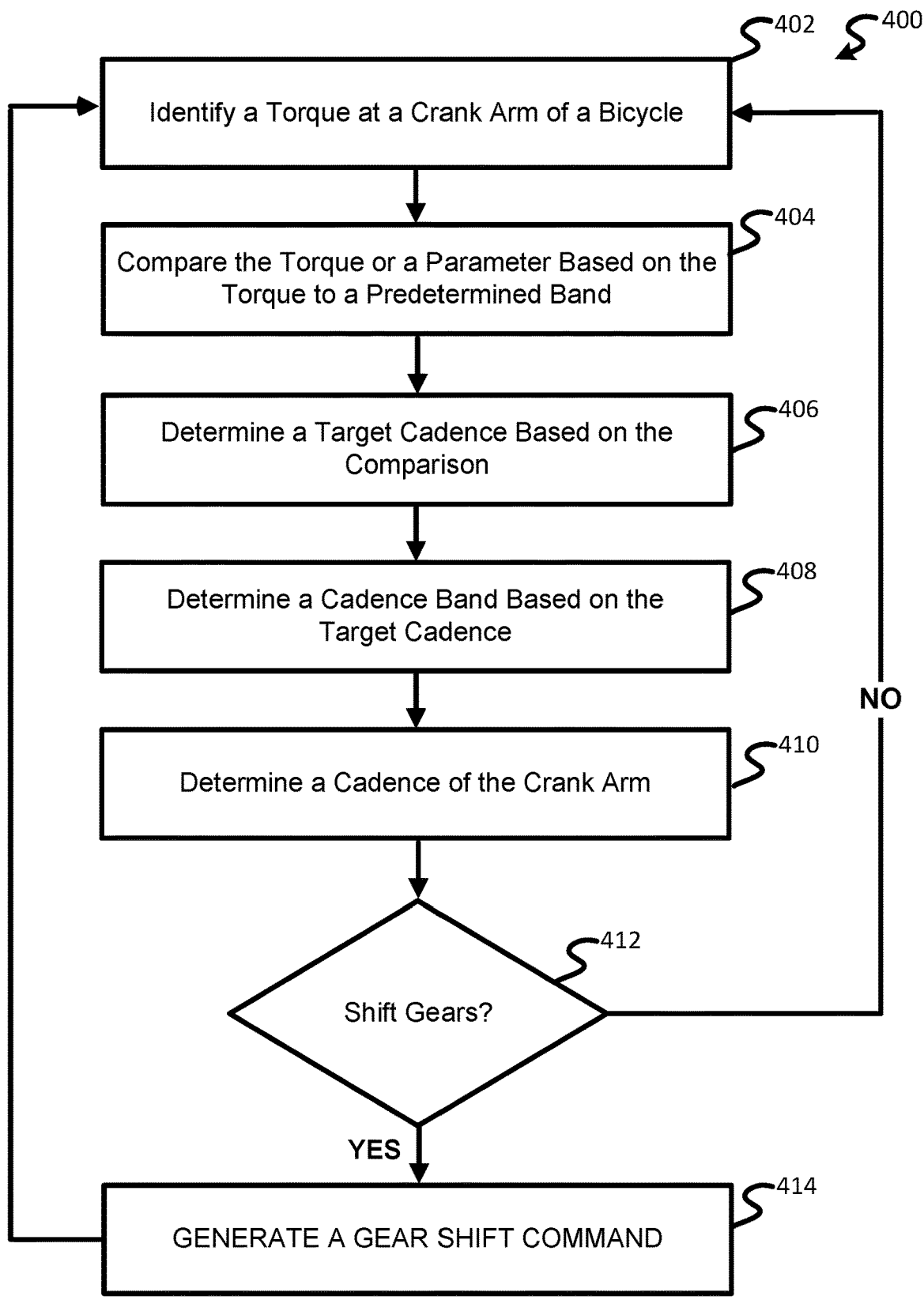
FIG. 4 is a flow chart of an embodiment of a method for modifying an automatic shifting mode.
Figure 6:
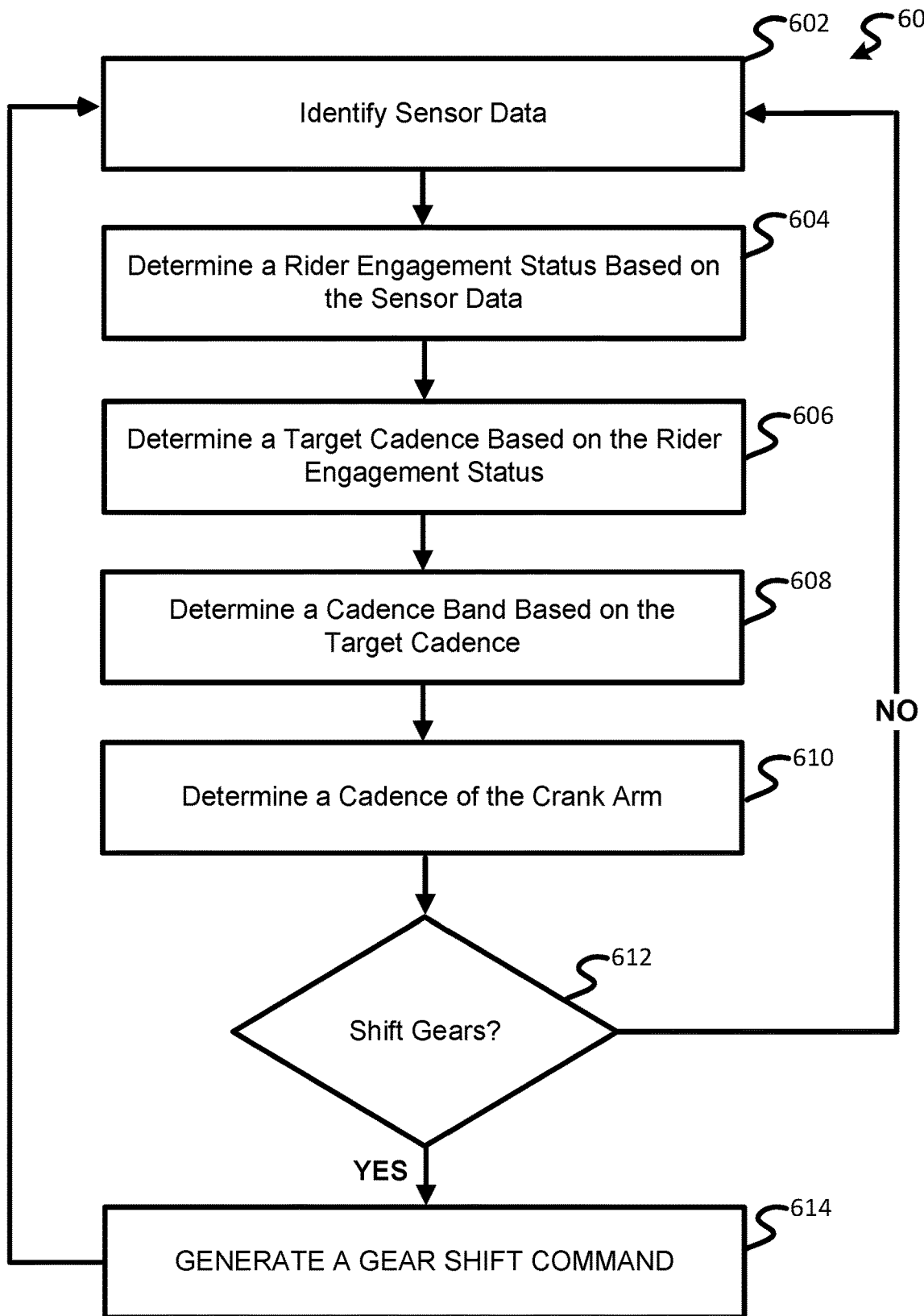
FIG. 6 is a flow chart of another embodiment of a method for modifying an automatic shifting mode.

FIG. 3 illustrates a flow chart of an embodiment for a method 300 of controlling a bicycle, particularly as related to an automatic, or automatic shifting, mode of a bicycle and/or bicycle component(s). FIG. 4 illustrates a flow chart of an embodiment of a method 400 for controlling an automatic shifting mode of a bicycle. FIG. 6 illustrates a flow chart of another embodiment of a method 600 for controlling an automatic shifting mode of a bicycle. As presented in the following, acts may be performed using any combination of the components indicated in FIGS. 1, 2, 8, and/or 9. For example, the following acts may be performed by a processor, as integrated with a system control device 150 that may be integrated with one or more bicycle components 138, 122, and/or 102. Additional, different, or fewer acts may be provided. The acts are performed in the order shown or other orders. The acts may also be repeated and/or performed at multiple times throughout the method. For example, a cadence band for control of electronic shifting may be adjusted based on a riding scenario (e.g., an effort-based rider engagement status; hereinafter, a rider engagement status) for the bicycle. The rider engagement status for the bicycle may be, for example, an input torque at a crank arm of the bicycle, whether the rider is standing or seated, and/or an inclination of the bicycle.

An automatic shifting system may be configured, such as with appropriate sensors or other devices, to monitor and/or detect system parameters to be used for system control. For example, the automatic shifting system may use one or more of cadence, power, and/or speed measurement to control shifting of the transmission.

Some initial parameters that may, for example, be established include any combination of the following. Cadence is a rotation of the cranks as measured in, for example, revolutions per minute ("RPM"). Default cadence or nominal cadence is a preferred or target cadence established by, for example, the rider during or prior to riding. Default torque or nominal torque is a preferred torque established by, for example, the rider during or prior to riding. A cadence band is a set range of cadences where the system will stay within a same gear. The cadence band may include an upper cadence limit and/or a lower cadence limit. The system may shift outboard (e.g., to a harder gear) when the measured cadence is higher than the upper cadence limit and may shift inboard (e.g., to an easier gear) when the measured cadence is lower than the lower cadence limit. A minimum target cadence is a target cadence for an easier ride (e.g., a casual ride), as defined by an input torque to a crank arm of the bicycle by the rider. A maximum target cadence is a target cadence for a harder ride (e.g., a technical ride), as defined by the input torque. An intermediate target cadence is a cadence for a medium ride (e.g., an endurance fitness ride), as defined by the input torque. The intermediate target cadence is greater than the minimum target cadence and less than the maximum target cadence. A lower torque limit is the torque below which the minimum target cadence is set. An upper torque limit is the torque above which the maximum target cadence is set. The minimum target cadence, the maximum target cadence, and the intermediate target cadence may be established by, for example, the rider during or prior to riding. A target cadence modifier is a modifier to the target cadence based on the rider engagement status for the bicycle. An input torque-based target cadence modifier may include a maximum target cadence modifier and/or a minimum target cadence modifier. For example, from an intermediate target cadence, adding a maximum target cadence modifier (e.g., a positive value) to the target cadence may provide the maximum target cadence, and adding a minimum target cadence modifier (e.g., a negative value) to the target cadence may provide the minimum target cadence. Averaging period defines an amount of time over which torque is averaged for use as an input in a method for controlling an automatic shifting mode of the bicycle.

The parameters are used, either independently or in combination, by the system control device to control the automatic shifting system of the bicycle, for example as is indicated in the flow charts provided in FIGS. 3 and 4.

In act 302, the system control device determines if one or more automatic mode entry conditions are met. The automatic mode entry conditions may be any criteria operable to indicate an intent to enter an automatic mode of a component of the bicycle. In an embodiment, one or more buttons may be enacted (e.g. depressed or actuated) for a period of time. The buttons may be multiple purpose buttons, such as electronic shifting devices, configured as levers, plunger type buttons, rocker type buttons, or any other electronic actuation device. For example, the buttons may be typically used to indicate that a component, such as one or more bicycle derailleurs, is to shift a chain of the bicycle to a different gear, but when actuated in combination for at least three seconds, the system control device causes the component to enter into automatic mode. Other actuation time periods and/or other multi-purpose button based initiation techniques may also be used. For example, multiple system control buttons may be provided, such as manual shift control devices for electronic derailleurs.

In an embodiment, individual buttons of the multi-purpose buttons may have three or more actuating effects. In an embodiment, at least one button is provided for controlling a rear derailleur of a bicycle. A first button actuated (e.g., in a first direction) causes a rear derailleur to change the bicycle chain to a larger sized sprocket. The first button actuated in a second way (e.g., in a second direction) or a second button actuated independently causes the rear derailleur to change the bicycle chain to a smaller sized sprocket. The first button and/or the second button actuated for a length of time causes the system control device to enter into an automatic shifting mode. For example, the length of time may be three seconds. In an embodiment, the first button and/or the second button may provide a button release signal when the respective button is released by a user, and the absence of a button release signal within a period of time may trigger entry into an automatic shifting mode of the system control device.

In another embodiment, a bicycle speed may be monitored by the system control device using a speed determination device, such as a wheel speed sensor. When the system control device determines that the bicycle speed, such as is indicated by a wheel speed in this example, is above a minimum value, the system control device causes the component to enter into automatic mode.

In act 304, cadence and/or speed parameters are established. The cadence and/or speed parameters may be established using any technique. The speed and/or cadence parameters are used by the system control device to determine when an automatic adjustment, such as a shift using a derailleur, is to be enacted. In an embodiment, one or more cadence parameters are determined by the system control device using a cadence sensor. The system control device measures a cadence of the bicycle for a period of time, and establishes a value derived from the measured cadence over that time as the cadence parameter. The derived value may be any value characteristic of the cadence over the period of time. For example, the derived value may be an average, mode, or mean value for the cadence over the period of time. Also, the period of time may be an established or referenced period of time. In an embodiment, the period of time is equal to a period of time a button is actuated. For example, if two buttons are actuated for three seconds to cause the system control device to enter into an automatic mode, the system control device records values using the cadence sensor, during the time the two buttons are actuated to gather data for deriving the cadence value to establish.

In an embodiment, the system control device gathers cadence data over a period of time and determines multiple values, such as a mean and a standard deviation of the cadence over that time. The mean value and the standard deviation value may be used to establish an operations range for the automatic mode. For example, the upper cadence limit and the lower cadence limit may be established from the mean value and the standard deviation value to determine characteristics of automatic shifting mode shifts. The upper cadence limit and the lower cadence limit may also be determined using other techniques. For example, an average cadence may be determined over a period of time; the upper cadence limit may be established as a pre-set cadence value higher than the average cadence, and the lower cadence limit may be established as a preset cadence value lower than the average cadence. The preset values may be the same or different for the setting of the upper cadence limit and the lower cadence limit.

In another embodiment, one or more predetermined cadence parameters are saved in a memory of the system control device, and the one or more predetermined cadence parameters are established as the cadence and/or speed parameters. For example, a set of an upper cadence limit and a lower cadence limit may be manually input into the memory before riding or may be stored in the memory during riding (e.g., a prior bicycle ride) of the system control device.

In act 306, the system control device compares active cadence and/or speed parameters to cadence and/or speed parameters established in act 304. The comparison may be executed using any technique that may qualify an active cadence and/or speed of the bicycle against the established cadence and/or speed parameters. In an embodiment, a current measured speed and/or cadence value is compared to the upper cadence limit and the lower cadence limit established in act 304. For example, the upper cadence limit and the lower cadence limit may be established in act 304, and a trailing time average of cadence values recorded for a period of time (e.g., the last one second) may be compared against the upper cadence limit and the lower cadence limit. In other words, the system control device may determine whether the trailing time average of cadence values is within a predetermined cadence band defined by the upper cadence limit and the lower cadence limit, and if the trailing time average of cadence values is outside the predetermined cadence band, determine whether the trailing time average of cadence values is greater than the upper cadence limit or less than the lower cadence limit. This comparison may be repeated periodically or conducted continuously by the system control device during automatic mode operation.

In act 308, the system control device adjusts a component based on the comparison performed in act 306. In an embodiment, the system control device causes the rear derailleur to change a gear of the bicycle based on the comparison performed in act 306. For example, the system control device shifts to an easier gear when a detected cadence reaches and/or goes below the lower cadence limit, and/or the system control device shifts to a harder gear when the detected cadence reaches and/or goes above the upper cadence limit.

In act 310 the system control device determines if one or more automatic mode modification conditions (e.g., a change in input torque at a crank arm of the bicycle) are met. Automatic mode modification conditions are conditions that when met trigger an altering or change of an operating parameter of the automatic mode. In an embodiment, the automatic mode modification conditions are conditions that, when met subsequent to the establishment of cadence and/or speed parameters in act 304, trigger an altering or change of the operating parameter of the automatic mode. In an embodiment, multiple automatic mode modification conditions are used to alter or change the operating parameters of the automatic mode. Further, detecting and/or determining the multiple modification conditions (act 310), and subsequent modification of automatic mode (act 312), as described further below, may occur at different positions of the indicated sequence. For example, the determining and/or modifying may occur after the establishment of the cadence and/or speed parameters (act 304), but before the comparing of the active cadence and/or speed (act 306).

Different actions and/or measured values may be an automatic mode modification condition. In an embodiment, operating a manual control that is not necessary for automatic mode may be an automatic mode modification. For example, a button depression, such as a depression of a shifting multi-use button described above, may be an automatic mode modification condition. While the system control device is operating in automatic mode (e.g., causing at least one bicycle shifting component to shift gears based on cadence and/or speed parameters), there is no need to manually depress a shifting button to indicate a shift. A manual shift button depression during the automatic mode operation may be interpreted as indicating intent to change a parameter of the automatic mode, such as the system control device disengaging or pausing automatic mode.

Other actions and/or measured values may be automatic mode modification conditions. In an embodiment, one or more cadence values are automatic mode modification conditions. For example, a cadence sensor, such as a crank or crank arm sensor, may be used to provide a bicycle cadence to the system control device, and when the cadence value indicated by the cadence sensor drops below the lower cadence limit or rises above the upper cadence limit (e.g., initiating a gear change within the automatic mode), this measured value or initiated action (e.g., gear change) may be an automatic mode modification condition.

In act 312 the control device modifies the automatic mode of the component based on the determination in act 310. The modification may be to any operational parameter of the automatic mode. For example, the modification may be to the upper cadence limit and/or the lower cadence limit, or other operational parameters. In an embodiment, a modification condition involving a depression of a shift button during automatic mode operation may cause the system control device to increase the upper cadence limit and/or decrease the lower cadence limit.

In an embodiment, a modification condition involving a slow speed during automatic mode operation may cause the system control device to pause or end the automatic mode operation. In an embodiment, a modification condition involving a slow cadence during automatic mode operation may cause the system control device to pause or end the automatic mode operation. Any parameter described herein may be modified based on the determination and/or detection of any particular modification condition described herein.

In an embodiment, subsequent to, or concurrent with, modifying an automatic mode parameter (e.g. modifying the lower cadence limit and/or the upper cadence limit) (act 312), the system control device continues to operate in the automatic mode with the modified parameters.

Further description of the provided functions, automatic mode parameters, modification conditions, and other embodiments of the control system are described below. These functions, automatic mode parameters, and modification conditions may be implemented in an embodiment in any combination or as specifically described herein.

FIG. 4 illustrates a flow chart for an embodiment of a method 400 for modifying an automatic shifting mode. In the embodiment shown in FIG. 4, an instantaneous cadence may be set, or established, upon starting or initiating automatic mode. In the embodiment, automatic shifting starts with pushing or otherwise actuating an up shift button and/or a down shift button for a period of time, such as three seconds. This time is variable and may be anything longer than a normal shift time. The system control device records the cadence of the rider during the three seconds, for example. The system control device sets the upper cadence limit and the lower cadence limit (e.g., a cadence band and a cadence range). The cadence is measured and compared with the cadence band, and the system control device may shift gears based on the comparison (e.g., if the measured cadence is outside of the cadence band). One or more automatic mode parameters may be modified based on a comparison of input torque identified at a crank arm of the bicycle to one or more thresholds (e.g., modification conditions).

In act 402, the system control device (e.g., a processor the system control device 150) identifies a torque at a crank arm of a bicycle. For example, the system control device determines an input torque on a crank arm of the bicycle based on data from one or more sensors of the bicycle. The data from the one or more sensors may be data from any number of different types of sensors including, for example, one or more torque sensors, one or more strain gauges, and/or a power meter. The system control device may identify and/or receive data from other types of sensors to determine the input torque on the crank arm. In one embodiment, the determined input torque on the crank arm is a torque at a particular instance in time. In another embodiment, the system control device determines an average input torque on the crank arm based on data from the one or more sensors over a period of time (e.g., over the averaging period). For example, the system control device determines the torque at the crank arm of the bicycle from torque data generated by the one or more sensors of the bicycle at a predetermined time interval (e.g., a sampling interval; every 500 ms, 100 ms, 50 ms, 10 ms) and stores the determined torque and/or the torque data within a torque data set in a memory of the system control device. The system control device averages a subset of the torque data set. The subset of the torque data set corresponds to, for example, the averaging period (e.g., three seconds).

In act 404, the system control device compares the identified torque or a parameter based on the identified torque to a predetermined band. For example, the predetermined band is a predetermined torque band, and the system control device compares the identified torque to the predetermined torque band. The predetermined torque band, for example, has an upper limit (e.g., an upper torque limit) and a lower limit (e.g., a lower torque limit). The comparison of the identified torque to the predetermined torque band includes, for example, the system control device determining whether the identified torque is within the predetermined torque band or outside of the predetermined torque band. In other words, the system control device determines, for example, whether the identified torque is greater than the lower torque limit and less than the upper torque limit, the identified torque is less than or equal to the lower torque limit, or the identified torque is greater than or equal to the upper torque limit.

In one embodiment, the parameter is input power at the crank arm, and the system control device identifies the input power at the crank arm and compares the identified input power to a predetermined input power band. The predetermined input power band has, for example, an upper limit (e.g., an upper input power limit) and a lower limit (e.g., a lower input power limit). The comparison of the identified input power to the predetermined input power band includes, for example, the system control device determining whether the identified input power is within the predetermined input power band or outside of the predetermined input power band. In other words, the system control device determines, for example, whether the identified input power is greater than the lower input power limit and less than the upper input power limit, the identified torque is less than or equal to the lower input power limit, or the identified input is greater than or equal to the upper input power limit.

In one embodiment, the identification of the input power at the crank arm includes the system control device receiving data representing the input power at the crank arm from one or more sensors (e.g., a power meter) of the bicycle. In another embodiment, the identification of the input power at the crank arm includes the system control device receiving data representing cadence (e.g., an average cadence over a period of time, such as the averaging period) of the crank arm of the bicycle from one or more sensors of the bicycle (e.g., one or more wheel speed sensors, one or more cadence sensors, and/or a power meter) and data representing input torque (e.g., an average torque over the period of time, such as the averaging period) at the crank arm of the bicycle from one or more sensors of the bicycle (e.g., one or more torque sensors, one or more strain gauges, and/or a power meter), and calculating the input power at the crank arm based on the data representing cadence of the crank arm and the data representing torque at the crank arm.

In act 406, the system control device determines a target cadence based on the comparison. For example, the system control device determines the target cadence based on the comparison of the identified torque to the predetermined torque band. Based on the comparison, when the system control device determines the identified torque is less than the lower torque limit (or less than or equal to the lower torque limit), the system control device determines the target cadence to be a first predetermined target cadence (e.g., the minimum target cadence); when the system control device determines the identified torque is greater than the upper torque limit (or greater than or equal to the upper torque limit), the system control device determines the target cadence to be a second predetermined target cadence (e.g., the maximum target cadence). The second predetermined target cadence is greater than the first predetermined target cadence. The first predetermined target cadence and the second predetermined target cadence may be stored in the memory of the system control device and may be accessed by a processor of the system control device as part of the determination of the target cadence. The first predetermined target cadence and the second predetermined cadence may be stored in the memory of the system control device during or after manufacture of the system control device and/or may be set and stored in the memory of the system control device by a rider or another user.

The minimum target cadence may represent a lowest target cadence used during automatic shifting or may represent a largest allowable torque-based decrease in target cadence. For example, the minimum target cadence may be set when the rider is on a casual bicycle ride and not riding for fitness. Such a rider engagement status (e.g., the casual bicycle ride) may be identified by the system control device based on the torque identified in act 402, for example. For example, when the rider is generating less than 15 Nm of input torque at the crank arm (e.g., the lower torque limit; as measured by one or more sensors of the bicycle), the system control device may determine and set the target cadence to be 75 RPM (e.g., the minimum target cadence). Other values may be used (e.g., set by the rider) for the lower torque limit and/or the minimum target cadence.

The maximum target cadence may represent a maximum target cadence used during automatic shifting or may represent a largest allowable torque-based increase in target cadence. For example, the maximum target cadence may be set when the rider is on a hard sustained climb or is within a rock garden and/or in a technical ride. Such a rider engagement status (e.g., the hard sustained climb or the technical ride) may be identified by the system control device based on the torque identified in act 402, for example. For example, when the rider is generating more than 35 Nm of input torque at the crank arm (e.g., the upper torque limit; as measured by one or more sensors of the bicycle), the system control device may determine and set the target cadence to be 95 RPM (e.g., the maximum target cadence). Other values may be used (e.g., set by the rider) for the upper torque limit and the and/or the maximum target cadence.

Based on the comparison, when the system control device determines the identified torque is within the predetermined torque band (e.g., greater than the lower torque limit (or greater than or equal to the lower torque limit) and less than the upper torque limit (or less than or equal to the upper torque limit)), the system control device determines the target cadence based on the torque identified in act 402. For example, the torque identified in act 402 is input into a function (e.g., a cadence function) between the lower torque limit at the minimum target cadence, and the upper torque limit at the maximum target cadence. In one embodiment, the function is a linear function. In other embodiments, non-linear functions may be used. Parameters for the function and/or the function may be stored in the memory of the system control device, and the system control device may input the torque identified in act 402 into the function to determine the target cadence (e.g., an intermediate target cadence).

An intermediate target cadence may be a variable target cadence between the lowest target cadence and the highest target cadence used during automatic shifting. For example, an intermediate target cadence may be set when the rider is an endurance fitness effort. Such a rider engagement status (e.g., the endurance fitness effort) may be identified by the system control device based on the torque identified in act 402, for example. For example, when the rider is generating more than 15 Nm of input torque at the crank arm (e.g., the lower torque limit; as measured by one or more sensors of the bicycle) but less than 35 Nm (e.g., the upper torque limit; as measured by one or more sensors of the bicycle), the system control device may determine and set the target cadence to be a cadence between 75 RPM (e.g., the minimum target cadence) and 95 RPM (e.g., the maximum target cadence) based on the torque identified in act 402 input into a function. Other values may be used (e.g., set by the rider) for the lower torque limit, the upper torque limit, the minimum target cadence, and/or the maximum target cadence.

Figure 5:
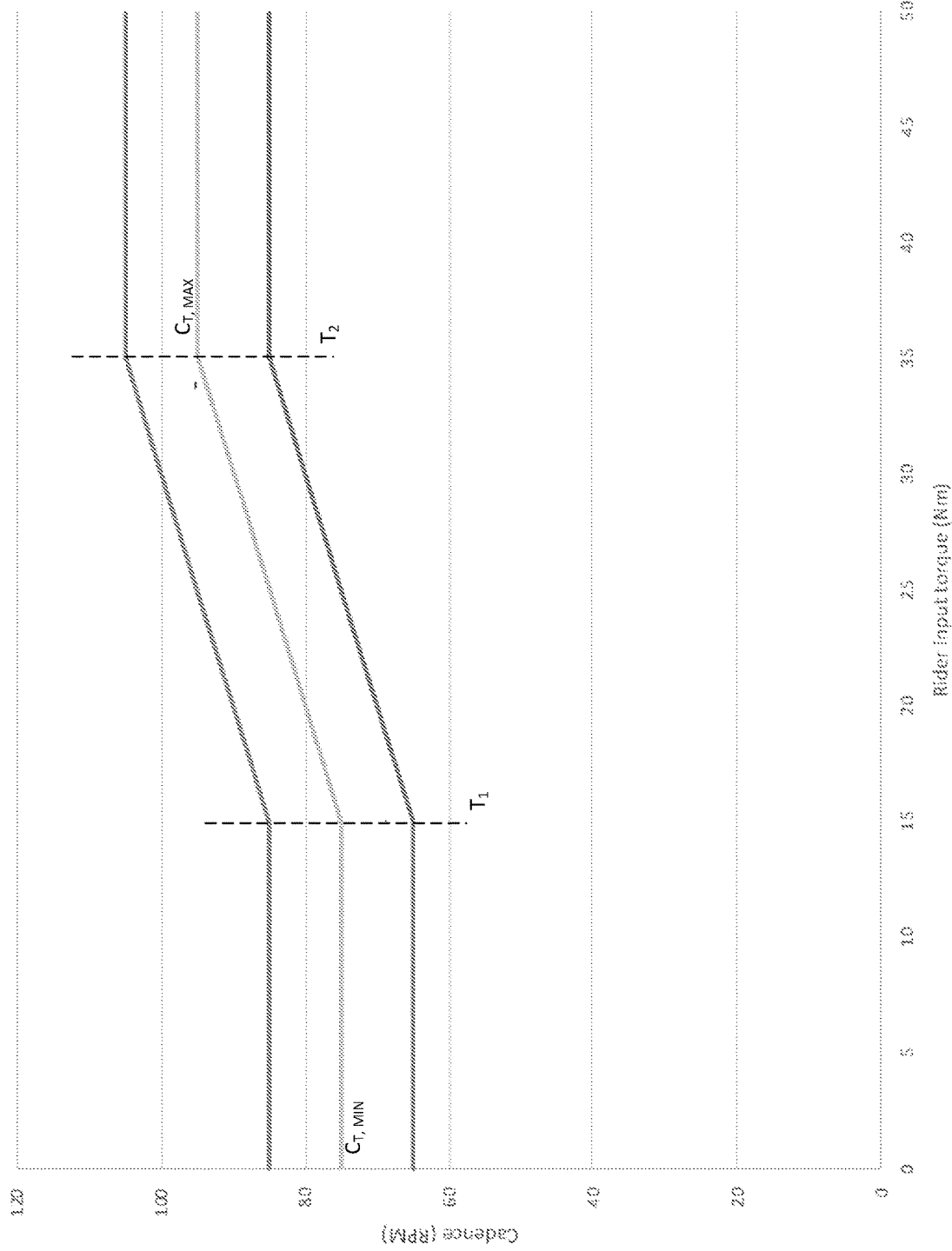
FIG. 5 is a graph of cadence over input torque for one embodiment of the method for modifying the automatic shifting mode of FIG. 4.

FIG. 5 is an exemplary plot of cadence over input torque by a rider. $T_1$ represents the lower torque limit, and $T_2$ represents the upper torque limit. The system control device may determine the target cadence for automatic shifting based on the functions illustrated in FIG. 5. When the identified torque is less than the lower torque limit $T_1$, the system control device determines the target cadence to be the minimum target cadence $C_{T,\ MIN}$. When the identified torque is greater than the upper torque limit $T_2$, the system control device determines the target cadence to the maximum target cadence $C_{T,\ MAX}$. When the identified torque is greater than the lower torque limit $T_1$ and less than the upper torque limit $T_2$, the system control device determines the target cadence by inputting the identified torque into the function (e.g., linear function) in FIG. 5 between the lower torque limit $T_1$ and the upper torque limit $T_2$.

A difference between the maximum target cadence and the minimum target cadence may be defined as a target cadence modifier. In one embodiment, the target cadence modifier may be broken up into a maximum target cadence modifier and a minimum target cadence modifier. The rider, for example may set and the memory of the system control device may store the target cadence modifier, the maximum target cadence modifier, and/or the minimum target cadence modifier. In one embodiment, a default target cadence corresponds to the minimum target cadence, and the system control device determines the maximum target cadence by adding the target cadence modifier to the default target cadence. For example, the target cadence modifier is 20 RPM and the default target cadence is 75 RPM, resulting in the maximum target cadence being 95 RPM. Other values may be provided. In another embodiment, the default target cadence is an intermediate target cadence (e.g., at a nominal or default torque). The system control device adds the maximum target cadence modifier to the default target cadence and adds or subtracts the minimum target cadence modifier to the default target cadence to provide the maximum target cadence and the minimum target cadence, respectively. For example, the maximum target cadence modifier is 6 RPM, the minimum target cadence modifier is −5 RPM, and the default target cadence is 85 RPM, resulting in the maximum target cadence being 91 RPM and the minimum target cadence being 80 RPM. Other values may be provided.

In one embodiment, in which input power is identified and compared to the predetermined input power band in act 404, the system control device determines the target cadence in a similar way as described above with reference to the identified torque, but using the identified input power instead of the identified torque. In other words, when the identified input power is less than the lower input power limit, the system control device identifies the minimum target cadence as the target cadence. When the identified input power is greater than the upper input power limit, the system control device identifies the maximum target cadence as the target cadence. When the identified input power is greater than the lower input power limit and less than the upper input power limit, the system control device determines the target cadence based on the identified input power. For example, the system control device determines the target cadence using the identified input power as an input into a function. The function may be linear or non-linear.

In act 408, the system control device determines a cadence band based on the target cadence determined in act 406. The cadence band includes an upper cadence limit and a lower cadence limit. The system control device may determine the upper cadence limit by adding a predetermined cadence upper limit modifier (e.g., upper limit modifier) to the target cadence determined in act 406, and may determine the lower cadence limit by subtracting (e.g., a positive value) or adding (e.g., a negative value) a predetermined cadence lower limit modifier (e.g., lower limit modifier) from/to the target cadence determined in act 406. For example, the upper limit modifier is 10 RPM, and the lower limit modifier is 8 RPM. Other values for the upper limit modifier and the lower limit modifier may be used. The upper limit modifier and the lower limit modifier may be different or the same.

The upper limit modifier and the lower limit modifier may be stored in the memory of the system control device. The upper limit modifier and the lower limit modifier may be set and stored in the memory during manufacture of the system control device or the bicycle, after manufacture of the system control device or the bicycle, and/or by a user of the bicycle. The upper limit modifier and the lower limit modifier may be the same for each target cadence and/or identified torque or may be different for at least some target cadences and/or identified torques. For example, the determined cadence band may have a first range (e.g., 20 RPM) when the target cadence is a first target cadence (e.g., 85 RPM; corresponding to a first input torque) that is greater than a second range (e.g., 18 RPM) when the target cadence is a second target cadence (e.g., 75 RPM; corresponding to a second input torque).

In one embodiment, the memory of the system control device stores upper limit modifiers, lower limit modifiers, upper cadence limits, lower cadence limits, or any combination thereof for a number of different target cadences and/or identified input torques, and the system control device identifies an upper limit modifier, a lower limit modifier, an upper cadence limit, a lower cadence limit, or any combination thereof based on a cadence or the input torque identified in act 402.

In act 410, the system control device identifies a cadence of the crank arm of the bicycle. For example, the system control device determines a cadence (e.g., an average cadence over a period of time, such as the averaging period) of the crank arm of the bicycle based on data from one or more sensors (e.g., a cadence sensor or a power meter). As another example, the system control device determines the cadence of the crank arm of the bicycle based on wheel speed data received from one or more wheel speed sensors of the bicycle. In one embodiment, the system control device estimates the cadence of the crank arm of the bicycle based on a wheel speed determined from the wheel speed data and a current gear ratio.

In act 412, the system control device determines whether the bicycle is to be shifted. For example, the system control device compares the cadence of the crank arm determined in act 410 to the cadence band determined in act 408. In other words, the system control device may determine whether the determined cadence of the crank arm is within or outside of the determined cadence band.

If the system control device determines a gear shift is needed based on, for example, the comparison of the determined cadence to the determined cadence band (e.g., the determined cadence is outside of the determined cadence band), the method 400 moves to act 414. If the system control device determines a gear shift is not needed based on, for example, the comparison (e.g., the determined cadence is within the adjusted cadence band), the method 400 may return to act 402.

While the determined cadence is within determined cadence band, the method may execute acts 402-412 once every predetermined period (e.g., an update period; every 500 ms, 200 ms, 100 ms, 50 ms). The update period may be the same or different than the sampling period. In one embodiment, the input torque is identified in act 402 a number of times (e.g., five or ten times) for each update period.

In act 414, the system control device generates a gear shift command based on the comparison in act 412 (e.g., when the determined cadence is outside the adjusted cadence band). If, based on the comparison, the determined cadence is less than the lower cadence limit of the determined cadence band, the system control device may generate a gear shift command for an inboard gear shift (e.g., to an easier gear); if, based on the comparison, the determined cadence is greater than the upper cadence limit of the determined cadence band, the system control device may generate a gear shift command for an outboard gear shift (e.g., to a harder gear). The gear shift command may include any number of different types of data including, for example, instructions for a motor of the rear derailleur to turn on, a direction of rotation for the motor, a length of time the motor is to remain on, and/or other data.

In one embodiment, a motor of the bicycle is actuated based on the gear shift command generated in act 414. For example, the system control device actuates a motor of the rear derailleur of the bicycle to move the rear derailleur and a chain supported by the rear derailleur to execute the gear shift identified within the gear shift command generated in act 414. Alternatively or additionally, the system control device actuates a drive unit such as an e-bike motor. After the gear shift initiated in act 414 is executed, the method 400 returns to act 402.

In one embodiment, in parallel with the method 400, the system control device may monitor whether the bicycle is coasting (e.g., not being pedaled or being pedaled very little, such as less than 10 RPM and/or with an input torque less than 2 Nm). For example, based on the input torque identified in act 402, the cadence identified in act 410, and/or other sensor data (e.g., wheel speed data), the system control device may identify a first transition. The first transition may be a transition between pedaling and coasting of the bicycle. When the system control device identifies the first transition, the system control device fixes the target cadence. In other words, the system control device does not set the target cadence based on the target cadence determined in act 406 after the first transition is identified. Instead, the target cadence is set to the most recently determined target cadence prior to the identification of the first transition. In other words, the target cadence is set to the most recently determined target cadence in act 406 prior to the identification of the first transition. Any determination made in act 406 after the first transition is identified is thus overridden. Alternatively, the method 400 is paused once the first transition is identified, but the system control device continues to identify the torque at the crank arm of the bicycle, identify the cadence of the crank arm of the bicycle, and/or identify a wheel speed of the bicycle.

The system control device may identify the first transition in any number of ways. For example, the system control device may compare the identified torque at the crank arm to a predetermined coasting torque threshold (e.g., 2 Nm), and identify the first transition when the identified torque is, for example, less than or equal to the predetermined coasting torque threshold. Alternatively or additionally (e.g., as confirmation), the system control device may compare the identified cadence of the crank arm of the bicycle to a predetermined coasting cadence threshold (e.g., 10 RPM) and/or compare the identified wheel speed of the bicycle to a predetermined coasting wheel speed threshold, and identify the first transition when the identified cadence is, for example, less than or equal to the predetermined coasting cadence threshold and/or the identified wheel speed is, for example, greater than or equal to the predetermined coasting wheel speed threshold. The predetermined coasting torque threshold, the predetermined coasting cadence threshold, and/or the predetermined coasting wheel speed threshold may be any number of values and be set during and/or after manufacture of the bicycle and/or the system control device, and/or may be set by the user.

As another example, the system control device may identify a first torque of, for example, the torque data set that corresponds to a first time point, and identify a second torque of, for example, the torque data set that corresponds to a second time point. The second time point is after first time point. The second time point may, for example, correspond to most recently recorded data of the torque data set, and the first time point may, for example, correspond to data of the torque data set recorded immediately before the most recently recorded data or a greater period of time before the most recently recorded data. The system control device calculates a difference between the first torque and the second torque and compares the calculated difference to a first predetermined threshold difference (e.g., set before or after manufacturing of the bicycle and/or the system control device, and/or set by the rider). The first predetermined threshold difference may represent a drop in torque at which coasting of the bicycle is assumed. When, based on the comparison, the system control device determines the calculated difference is, for example, greater than or equal to the first predetermined threshold difference, the system control device identifies the first transition.

After the system control device identifies the first transition, the system control device may identify whether the bicycle is being pedaled again (e.g., at 15 RPM or more and/or with an input torque of 4 Nm or more). For example, based on the input torque identified in act 402 and/or the cadence identified in act 410, the system control device may identify a second transition. The second transition may be a transition between coasting and pedaling of the bicycle. When the system control device identifies the second transition, the system control device again allows the target cadence to be determined and set in act 406. In one embodiment, the method 400 is resumed once the second transition is identified.

The system control device may identify the second transition in any number of ways. For example, the system control device may compare the identified torque at the crank arm to a predetermined pedaling torque threshold (e.g., 4 Nm), and identify the second transition when the identified torque is, for example, greater than or equal to the predetermined pedaling torque threshold. Alternatively or additionally (e.g., as confirmation), the system control device may compare the identified cadence of the crank arm of the bicycle to a predetermined pedaling cadence threshold (e.g., 15 RPM), and identify the second transition when the identified cadence is, for example, greater than or equal to the predetermined pedaling cadence threshold. The predetermined pedaling torque threshold and/or the predetermined pedaling cadence threshold may be any number of values and be set during and/or after manufacture of the bicycle and/or the system control device, and/or may be set by the user.

As another example, the system control device may identify a third torque of, for example, the torque data set that corresponds to a third time point, and identify a fourth torque of, for example, the torque data set that corresponds to a fourth time point. The third time point and the fourth time point are both after the second time point. The fourth time point may, for example, correspond to most recently recorded data of the torque data set, and the third time point may, for example, correspond to data of the torque data set recorded immediately before the most recently recorded data or a period of time before the most recently recorded data. The system control device calculates a difference between the fourth torque and the third torque and compares the calculated difference to a second predetermined threshold difference (e.g., set before or after manufacturing of the bicycle and/or the system control device, and/or set by the rider). The second predetermined threshold difference may represent a rise in torque at which pedaling of the bicycle is assumed. When, based on the comparison, the system control device determines the calculated difference is, for example, greater than or equal to the second predetermined threshold difference, the system control device identifies the second transition.

FIG. 6 illustrates a flow chart for another embodiment of a method 600 for modifying an automatic shifting mode. In the embodiment shown in FIG. 6, an instantaneous cadence may be set, or established, upon starting or initiating automatic mode. In the embodiment, automatic shifting starts with pushing or otherwise actuating an up shift button and/or a down shift button for a period of time, such as three seconds. This time is variable and may be anything longer than a normal shift time. The system control device records the cadence of the rider during the three seconds, for example. The system control device sets the upper cadence limit and the lower cadence limit (e.g., a cadence band and a cadence range). The cadence is measured and compared with the cadence band, and the system control device may shift gears based on the comparison (e.g., if the measured cadence is outside of the cadence band). One or more automatic mode parameters may be modified based on a determined rider engagement status (modification conditions). The method 600 may be executed in parallel with or instead of the method 400.

In act 602, the system control device identifies sensor data. The system control device may identify the sensor data at a first time interval (e.g., every 5, 10, 50, 100, 200 ms). The sensor data identifies and/or represents a state of the bicycle. The sensor data may be any number of different types of sensor data from any number of different types of sensors. The sensor data may be stored in a memory of the system control device, and the system control device may identify the sensor data from the memory. Alternatively or additionally, the system control device may receive at least some of the sensor data directly from one or more sensors of the bicycle.

Sensors of the bicycle, from which the system control device receives the sensor data, for example, may include one or more pressure sensors at a seat of the bicycle that generate pressure data, one or more switches at the seat of the bicycle that identify whether a threshold pressure is being applied to the seat, one or more accelerometers that generate acceleration data, one or more gyroscopes that generate angular velocity data, one or more inclinometers that generate inclination data, one or more lidar sensors that generate position data, one or more torque sensors (e.g., a power meter) that generate torque data and/or power data at a crank arm of the bicycle, one or more other types of sensors that generate other data, or any combination thereof.

In act 604, the system control device determines a rider engagement status based on the sensor data identified in act 602. The system control device may determine one or more rider engagement statuses based on the sensor data identified in act 602. The rider engagement status may describe any number of different riding scenarios that affect the target cadence for automatic shifting. For example, the rider engagement status may identify whether the rider of the bicycle is standing or seated, whether the bicycle is pointed uphill or downhill, whether the bicycle is in a technical or high powered state, or any combination thereof. The system control device may identify other rider engagement statuses. For example, the rider engagement status may include the input torque at a crank arm of the bicycle (see the method 400 of FIG. 4), and the system control device may execute the method 600 of FIG. 6 instead of the method 400 of FIG. 4. Alternatively, the system control device may execute the method 600 of FIG. 6 in parallel with the method of FIG. 4.

For example, the system control device may determine whether the rider is seated or standing based on the sensor data identified in act 602. In one embodiment, the system control device may determine whether the rider is seated or standing based on pressure data identified in act 602. For example, the system control device may compare a pressure of the pressure data identified in act 602 to a predetermined pressure threshold, and based on the comparison, identify the rider is seated when the pressure is greater than the predetermined pressure (e.g., greater than or equal to) and identify the rider is standing when the pressure is less than the predetermined pressure. The predetermined pressure may be stored in the memory of the system control device and/or may be set by the rider.

In another embodiment, the sensors of the bicycle include one or more pressure switches, and the system control device identifies a signal from the one or more pressure switches in act 602. The one or more pressure switches generate the signal when a threshold pressure is reached, which may indicate the rider is seated. In other words, when the system control device identifies the signal from the one or more pressure switches in act 602, the system control device determines the rider is seated in act 604, and when the system control device identifies lack of the signal (e.g., the threshold pressure is not reached), the system control device determines the rider is standing in act 604.

As another example, the system control device may determine an inclination of the bicycle. For example, the system control device may determine whether the bicycle is being pointed uphill or downhill based on the sensor data identified in act 602. The sensors of the bicycle include, for example, the one or more accelerometers, the one or more gyroscopes, and/or the one or more inclinometers, and the system control device determines an inclination of the bicycle based on the inclination data, the acceleration data, and/or the angular velocity data generated by the sensors.

In one embodiment, the sensors of the bicycle include an inclinometer, and the system control device identifies the inclination data generated by the inclinometer in act 602. The system control device determines an inclination of the bicycle based on the inclination data identified in act 602. The system control device determines the bicycle is pointed uphill when the determined inclination is a positive value and determines the bicycle is pointed downhill when the determined inclination is a negative value. In one embodiment, the system control device determines an extent of the inclination.

As yet another example, the system control device may determine whether the bicycle is in a technical or high powered state based on the sensor data identified in act 602. For example, the sensors of the bicycle include the one or more torque sensors, and the system control device identifies, in act 602, the torque data generated at the crank arm of the bicycle. In one embodiment, the system control device determines (e.g., calculates) an input power at the crank arm of the bicycle based on the identified torque data. In another embodiment, the sensors of the bicycle include a power meter that generates power data representing an input power at the crank arm of the bicycle, and the system control device determines the input power based on the power data identified at act 602. In one embodiment, the determined input power is an average input power over a predetermined period of time (e.g., one second).

The system control device compares the determined input power at the crank arm of the bicycle to a predetermined power threshold. The predetermined power threshold represents an input power at which a technical and/or a high powered ride may be assumed. The system control device determines, based on the comparison, that the bicycle is in the technical or high powered state when the determined input power at the crank arm is greater than (e.g., greater than or equal to) the predetermined powered threshold. In one embodiment, the predetermined power threshold is 300 Nm. Other predetermined power thresholds may be used. The predetermined power threshold may be stored in the memory of the system control device and/or may be set by the rider. In one embodiment, the system control device may determine the bicycle is in the technical or high powered state based on a user input. For example, the rider may press a button on the bicycle to generate a request to temporarily enter the technical or high powered state, and transmit the generated request to the system control device. The system control device may determine the bicycle is in the technical or high powered state based on the generated request.

In act 606, the system control device determines a target cadence based on the determined rider engagement status. The system control device may determine the target cadence based on one or more rider engagement statuses determined in act 604. For example, adjustments to the target cadence in act 606 based on different determined rider engagement statuses may be additive. For example, one or more target cadence modifiers corresponding to one or more rider engagement statuses determined in act 604, respectively, may be determined (e.g., a total target cadence modifier) and added to, for example, a default target cadence. The target cadence modifiers determined in act 606 of the method 600 may be additive with a target cadence modifier determined in the method 400. The target cadence modifiers, however, may not increase the target cadence above a maximum target cadence.

For example, the target cadence modifiers may be determined in parallel (e.g., the method 600 and/or the method 400 may be executed in parallel for different engagement statuses), and the system control device may determine the total target cadence modifier by adding the different target cadence modifiers. The total target cadence modifier may be compared to a predetermined modifier limit, and if the total target cadence modifier is greater than the predetermined modifier limit, the total target cadence modifier may be set to the predetermined modifier limit. The predetermined modifier limit may be stored in the memory of the system control device and/or set by the rider. In one embodiment, the system control device determines the target cadence based on the total target cadence modifier and compares the determined target cadence to a predetermined maximum target cadence. If the determined target cadence is greater than the predetermined maximum target cadence, the target cadence may be set to the predetermined maximum target cadence in act 606.

In one embodiment, the system control device may determine the target cadence based on the determination of whether the rider is seated or standing from act 604. For example, when the system control device determines the rider is seated in act 604, the system control device may not adjust the target cadence from the default target cadence and/or the previously determined target cadence. When the system control device determines the rider is standing in act 604, the system control device may add a predetermined riding position target cadence modifier to the default target cadence and/or the previously determined target cadence. The predetermined riding position target cadence modifier may have a negative value, such that the target cadence adjustment of act 606 results in a lower target cadence. In other words, the determined target cadence is higher when the rider of the bicycle is in the seated position compared to when the rider of the bicycle is in the standing position.

In another embodiment, the system control device may determine the target cadence based on the determined inclination of act 604. In one embodiment, the determination of the target cadence based on the determined inclination of act 604 includes the system control device comparing the identified inclination to a lower inclination threshold and an upper inclination threshold. The lower inclination threshold and the upper inclination threshold form an inclination band, and the system control device determines, based on the comparisons, whether the determined inclination is within the inclination band or outside the inclination band. In other words, the system control device determines whether the determined inclination is less than the lower inclination band, whether the determined inclination is greater than the upper inclination band, or whether the determined inclination is within the inclination band. The lower inclination threshold and/or the upper inclination threshold may be stored in the memory of the system control device and/or may be set by the rider.

Figure 7:
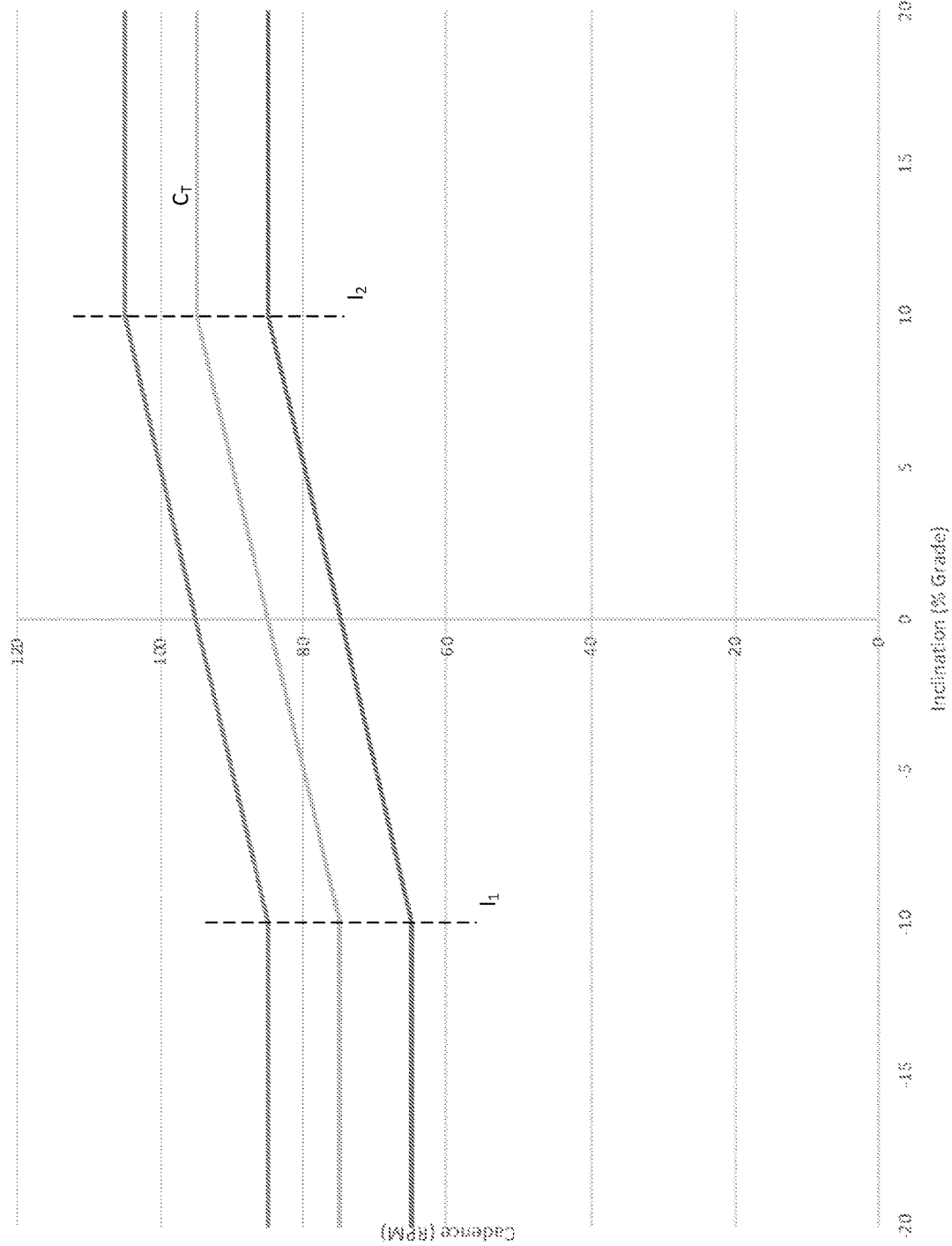
FIG. 7 is a graph of cadence over inclination for one embodiment of the method for modifying the automatic shifting mode of FIG. 6.

FIG. 7 shows an exemplary plot of cadence over inclination for one embodiment of the method for modifying the automatic shifting mode of FIG. 6. The system control device may determine the target cadence for automatic shifting based on the functions illustrated in FIG. 7. For example, when the determined inclination is less than the lower inclination threshold $I_1$ (e.g., −10 percent grade), the system control device may add a predetermined downhill target cadence modifier (e.g., having a negative value; −10 RPM) to the default target cadence and/or the previously determined target cadence. When the determined inclination is greater than the upper inclination threshold $I_2$ (e.g., 30 percent grade; 10 RPM), the system control device may add a predetermined uphill target cadence modifier (e.g., having a positive value; 10 RPM) to the default target cadence and/or the previously determined target cadence. In other words, the determined target cadence is greater when the determined inclination is positive (e.g., the bicycle is pointing uphill) compared to when the determined inclination is negative (e.g., the bicycle is pointing downhill).

In one embodiment, when the determined inclination is greater than the lower inclination threshold $I_1$ and less than the upper inclination threshold $I_2$, the system control device determines the target cadence (or an inclination-based target cadence modifier) by inputting the determined inclination into a function (e.g., linear function) between the lower inclination threshold $I_1$ at a first predetermined target cadence (e.g., 65 RPM) and the upper inclination threshold $I_2$ at a second predetermined target cadence (e.g., 95 RPM). The lower inclination threshold $I_1$, the first predetermined target cadence, the predetermined downhill target cadence modifier, the upper inclination threshold $I_2$, the second predetermined target cadence, the predetermined uphill target cadence modifier, or any combination thereof may be stored in the memory of the system control device during and/or set by the rider.

In one embodiment, the system control device adds the predetermined uphill target cadence modifier to the target cadence when the system control device determines the bicycle is pointed uphill, and adds the downhill target cadence modifier to the target cadence when the system control device determines the bicycle is pointed downhill. In other words, the system control device adjusts the target cadence based on whether the bicycle is pointed uphill or downhill, respectively, but does not otherwise vary the target cadence across different grades.

In yet another embodiment, the system control device may determine the target cadence based on whether the bicycle is in the technical or high powered state. When the system control device determines the bicycle is in the technical or high powered state in act 604, the system control device may set the target cadence to a predetermined maximum target cadence. In other words, the target cadence may be greatest when the system control device determines the bicycle is in the technical or high powered state. The predetermined maximum target cadence may be any number of values including, for example, 95 RPM, 105 RPM, or 120 RPM. Other values may be used for the predetermined maximum target cadence. The predetermined maximum target cadence may be stored in the memory of the system control device and/or set by the rider.

After the system control device determines the bicycle is in the technical or high powered state and determines the target cadence as the predetermined maximum target cadence, the system control device may pause the method 600 and execute an automatic adjustment method (e.g., the method 300) based on the target cadence determined in act 606 (e.g., the predetermined maximum target cadence).

The system control device may continue to receive the torque data and/or the power data at the first time interval, and may continue to compare the determined input power at the crank arm of the bicycle to the predetermined power threshold at the first time interval or a second time interval that is different than the first time interval. For example, the torque data and/or the power data may be received ten times (e.g., every 100 ms) for every time the determined input power at the crank arm is compared to the predetermined power threshold. In one embodiment, the determined power is an average power averaged over a period of time (e.g., the averaging period).

The system control device may resume the method 600 if, based on the continued comparison of the determined input power at the crank arm to the predetermined power threshold, the determined input power is less than the predetermined power threshold a predetermined number of times in succession. In other words, the system control device may determine the technical or high powered state is to be exited. For example, the system control device may resume the method 600 if the determined input power is less than the predetermined power threshold ten times in a row. The predetermined number of times in succession may be more or fewer. In one embodiment, the system control device may identify the technical or high powered state is to be exited based on a user input (e.g., a button press).

The system control device may adjust (e.g., decrease) the target cadence once the system control device determines the technical or high powered state is to be exited (e.g., an end of the technical or high powered state). For example, the system control device may decrease the target cadence from the predetermined maximum target cadence to the target cadence determined immediately before the technical or high powered state was identified. Alternatively, the system control device may decrease the target cadence to the default target cadence.

In act 608, the system control device determines a cadence band based on the target cadence determined in act 606. The cadence band includes an upper cadence limit and a lower cadence limit. The system control device may determine the upper cadence limit by adding a predetermined cadence upper limit modifier (e.g., upper limit modifier) to the target cadence determined in act 606, and may determine the lower cadence limit by subtracting (e.g., a positive value) or adding (e.g., a negative value) a predetermined cadence lower limit modifier (e.g., lower limit modifier) from/to the target cadence determined in act 606. For example, the upper limit modifier is 10 RPM, and the lower limit modifier is 8 RPM. Other values for the upper limit modifier and the lower limit modifier may be used. The upper limit modifier and the lower limit modifier may be different or the same.

The upper limit modifier and the lower limit modifier may be stored in the memory of the system control device. The upper limit modifier and the lower limit modifier may be set and stored in the memory during manufacture of the system control device or the bicycle, after manufacture of the system control device or the bicycle, and/or by a user of the bicycle. The upper limit modifier and the lower limit modifier may be the same for each target cadence or may be different for at least some target cadences. For example, the determined cadence band may have a first range (e.g., 20 RPM) when the target cadence is a first target cadence (e.g., 85 RPM) that is greater than a second range (e.g., 18 RPM) when the target cadence is a second target cadence (e.g., 75 RPM).

In one embodiment, the memory of the system control device stores upper limit modifiers, lower limit modifiers, upper cadence limits, lower cadence limits, or any combination thereof for a number of different target cadences, and the system control device identifies an upper limit modifier, a lower limit modifier, an upper cadence limit, a lower cadence limit, or any combination thereof based on the target cadence.

In act 610, the system control device identifies a cadence of the crank arm of the bicycle. For example, the system control device determines a cadence (e.g., an average cadence over a period of time, such as the averaging period) of the crank arm of the bicycle based on data from one or more sensors (e.g., a cadence sensor or a power meter). In another example, the system control device may determine the cadence of the crank arm of the bicycle based on wheel speed data received from one or more wheel speed sensors of the bicycle. In one embodiment, the system control device estimates the cadence of the crank arm of the bicycle based on a wheel speed determined from the wheel speed data and a current gear ratio.

In act 612, the system control device determines whether the bicycle is to be shifted. For example, the system control device compares the cadence of the crank arm determined in act 610 to the cadence band determined in act 608. In other words, the system control device may determine whether the determined cadence of the crank arm is within or outside of the determined cadence band.

If the system control device determines a gear shift is needed based on, for example, the comparison of the determined cadence to the determined cadence band (e.g., the determined cadence is outside of the determined cadence band), the method 600 moves to act 614. If the system control device determines a gear shift is not needed based on, for example, the comparison (e.g., the determined cadence is within the adjusted cadence band), the method 600 may return to act 602. While the determined cadence is within determined cadence band, the method may execute acts 602-612 once every predetermined period (e.g., an update period; every 500 ms, 200 ms, 100 ms, 50 ms).

In act 614, the system control device generates a gear shift command based on the comparison in act 612 (e.g., when the determined cadence is outside the adjusted cadence band). If, based on the comparison, the determined cadence is less than the lower cadence limit of the determined cadence band, the system control device may generate a gear shift command for an inboard gear shift (e.g., to an easier gear); if, based on the comparison, the determined cadence is greater than the upper cadence limit of the determined cadence band, the system control device may generate a gear shift command for an outboard gear shift (e.g., to a harder gear). The gear shift command may include any number of different types of data including, for example, instructions for a motor of the rear derailleur to turn on, a direction of rotation for the motor, a length of time the motor is to remain on, and/or other data.

In one embodiment, a motor of the bicycle is actuated based on the gear shift command generated in act 614. For example, the system control device actuates a motor of the rear derailleur of the bicycle to move the rear derailleur and a chain supported by the rear derailleur to execute the gear shift identified within the gear shift command generated in act 614. Alternatively or additionally, the system control device actuates a drive unit such as an e-bike motor. After the gear shift initiated in act 614 is executed, the method 600 returns to act 602.

Figure 8:
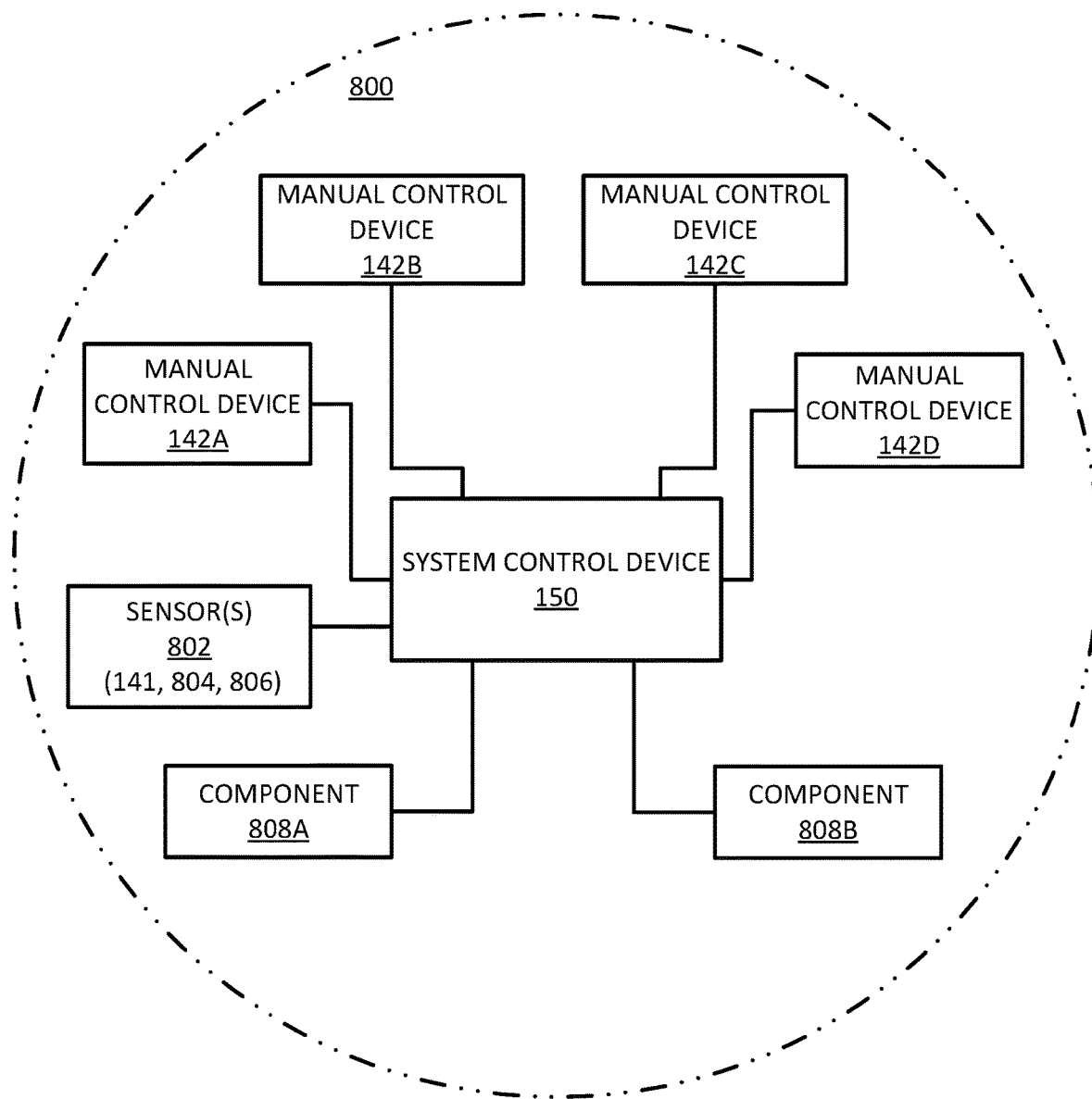
FIG. 8 is a block diagram of an exemplary bicycle control system for implementing methods of controlling a bicycle.

FIG. 8 illustrates a bicycle control system 800 that includes multiple manual control devices 142A-D, a system control device 150, at least one sensor 802, such as a sensor 141, a cadence sensor 804, and/or a speed sensor 806 described with respect to FIG. 1, and bicycle components 808A-B, such as a rear derailleur and/or a front derailleur, or one or more internal gear hubs. The manual control devices 142A-D are communicatively coupled with the system control device 150, such as by a cable or wirelessly, to communicate control signals to the system control device(s) 142. The system control device 150 is configured to communicate control signals responsive to the received control device signals, or resulting from automatic shifting determinations, to the component(s) 808A-B. In an embodiment, the system control device 150 is configured to communicate the control signals wirelessly to one or multiple bicycle components 808A-B. The control signals may be communicated wirelessly using any technique, protocol, or standard. For example, Institute of Electrical and Electronics Engineers ("IEEE") 802.11 standards, IEEE 802.15.1 or BLUETOOTH® standards, ANT™ or ANT+™ standards, and/or AIREA™ standards may be used. The bicycle components 808A-B may be any bicycle component. For example, the components 808A-B may be a drive train components and/or suspension components. In an embodiment, a component 808A may be a rear derailleur and the other component 808B may be a front derailleur. Other components may also be included. For example, the system control device 150 may be in communication with, or provide control signals for, three or more components, such as a front derailleur, a rear derailleur, and a front suspension system. Alternatively, the system control device 150 may only provide control signals for a single component 808A. In an embodiment, the receiver may communicate control signals wirelessly with one component 808A, and the one component 808A may communicate the control signals to another component 808B.

In an embodiment, the bicycle control system 800 includes at least one manual control device 142 including a control mechanism for generating a control signal to control at least one bicycle component 808A. The system control device 150 may be a standalone device, or may be integrated with one or more components 808A-B.

Figure 9:
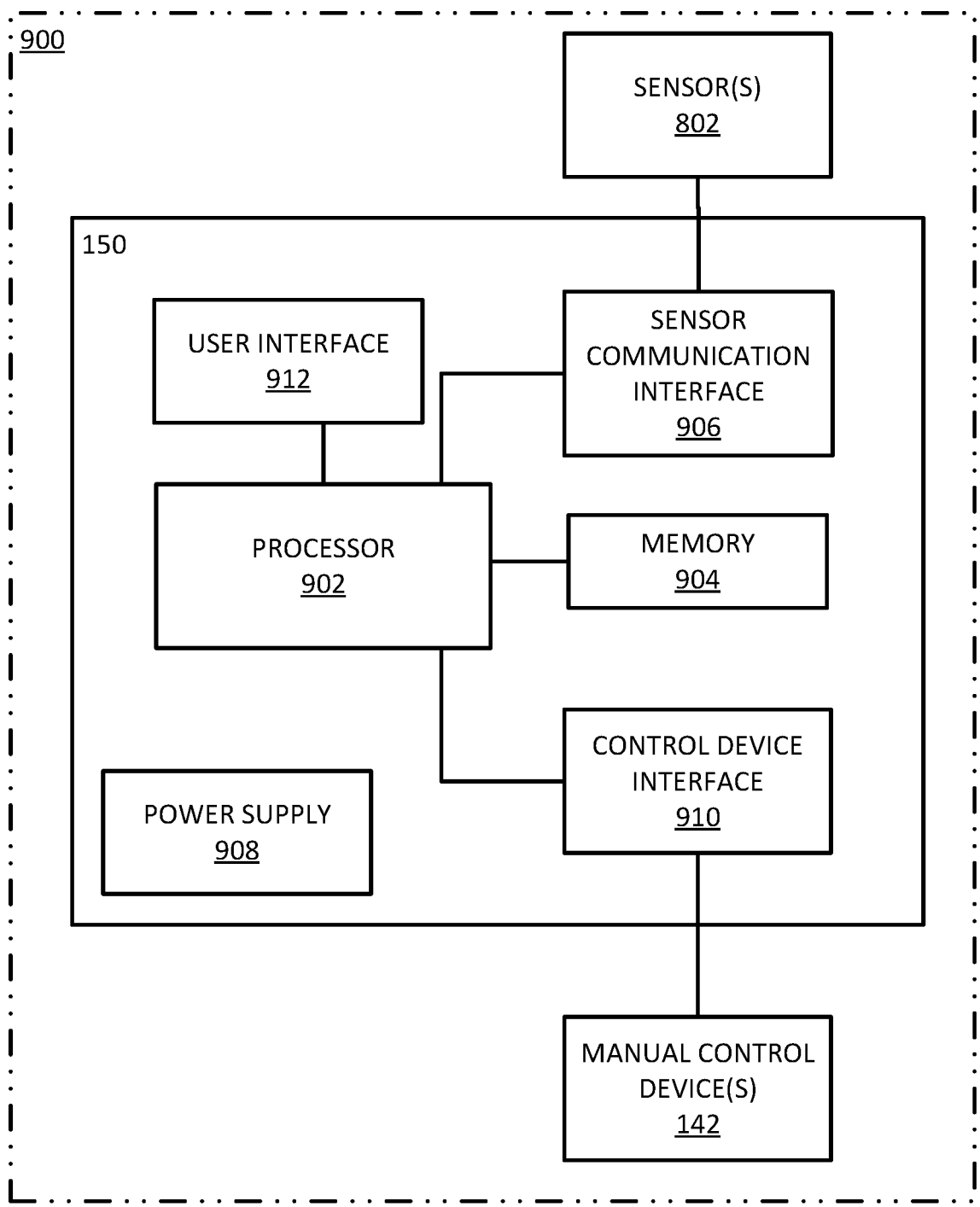
FIG. 9 is a block diagram of an exemplary control device for use in implementing methods of controlling a bicycle.

FIG. 9 is a block diagram of an exemplary control system 900 for a bicycle that may be used to implement a system control device 150. The control system 900 may be used alone to communicate with and control bicycle components, or the control system 900 may be used in conjunction with at least one other control system for components of the bicycle, such as a primary control system that may include alternative control devices such as brake lever housing integrated shift controllers. The control system 900 includes a system control device 150, one or more control devices 142, and/or one or more sensors 802. The system control device 150 includes a processor 902, a memory 904, a sensor communication interface 906, a power supply 908, and a control device interface 910. Optionally, the system control device 150 may also include a user interface 912. Additional, different, or fewer components are possible for the system control device 150.

The processor 902 may include a general processor, digital signal processor, an application specific integrated circuit (ASIC), field programmable gate array (FPGA), analog circuit, digital circuit, combinations thereof, or other now known or later developed processor. The processor 902 may be a single device or combinations of devices, such as through shared or parallel processing. In one embodiment, for example, a CPU 902 used may be an Atmel® ATmega324PA microcontroller with an internal eeprom memory, and a transmitter and a receiver used may be an Atmel® AT86RF231 2.4 GHz transceiver utilizing AES encryption and DSS spread spectrum technology supporting 16 channels and the IEEE 802.15.4 communication protocol.

The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the system control device 150, such as a secure digital (SD) memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

The memory 904 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The power supply 908 is a portable power supply, which may be stored internal to the system control device 150, or stored external to the system control device 150 and communicated to the system control device 150 through a power conductive cable. The power supply 908 may involve the generation of electric power, for example, using a mechanical power generator, a fuel cell device, photo-voltaic cells, or other power generating devices. The power supply 908 may include a battery such as a device consisting of two or more electrochemical cells that convert stored chemical energy into electrical energy. The power supply 908 may include a combination of multiple batteries or other power providing devices. Specially fitted or configured battery types, or standard battery types such as CR 2012, CR 2016, and/or CR 2032 may be used.

The control device interface 910 provides for data communication from the control devices 142 to the system control device 150. The control device interface 910 includes wired conductive signal and/or data communication circuitry operable to interpret signals provided by different control devices 142. For example, the control device interface 910 may include a series of ports for receiving control device input cables. Each of the ports may be distinguishable by the processor 902 through grouping tables or arrays, or through physical circuits or other circuitry that provide for grouping control device inputs. Alternatively, different control devices 142 may communicate with the system control device 150 wirelessly as is described herein.

The user interface 912 may be one or more buttons, keypad, keyboard, mouse, stylus pen, trackball, rocker switch, touch pad, voice recognition circuit, or other device or component for communicating data between a user and the system control device 150. The user interface 912 may be a touch screen, which may be capacitive or resistive. The user interface 912 may include a liquid crystal display ("LCD") panel, light emitting diode (LED), LED screen, thin film transistor screen, or another type of display. The user interface 912 may also include audio capabilities, or speakers. In an embodiment, the user interface is configured to provide a notice to a user that the system control device 150 has entered automatic mode, paused automatic mode, exited automatic mode, and/or modified a parameter of automatic mode. The notice may be audible, visual, and/or haptic. For example, an audible beep may be used. In an embodiment, an LCD panel is configured to display a visual notice.

In an embodiment, the user interface 912 includes multiple buttons and an LED indicator. The multiple buttons are used to communicate commands to the system control device 150, and the LED indicator lights to indicate input of the commands.

The sensor communication interface 906 is configured to communicate data such as sensor values with at least one sensor 802 The sensor communication interface 906 communicates the data using any operable connection. An operable connection may be one in which signals, physical communications, and/or logical communications may be sent and/or received. An operable connection may include a physical interface, an electrical interface, and/or a data interface. The sensor communication interface 80 provides for wireless communications in any now known or later developed format.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. Next one or more of the components may be paired with a separate device like a computer, tablet or phone. This paired device may provide the user interface to allow the user to communicate with the components on the bicycle, for example the system control device 150. Examples of communication are updating firmware, setting variables, and running diagnostic tools and analysis.

In accordance with various embodiments of the present disclosure, the methods described herein may be implemented with software programs executable by a computer system, such as the system control device 150. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device 150 is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method for controlling electronic shifting of a bicycle, the method comprising:
   identifying, by a processor, sensor data, the sensor data identifying a state of the bicycle;
   determining, by the processor, a rider engagement status based on the identified sensor data;
   determining, by the processor, a target cadence based on the determined rider engagement status;
   determining, by the processor, a cadence band based on the determined target cadence;
   modifying the target cadence by adding a target cadence modifier to the determined target cadence; and
   controlling the electronic shifting of the bicycle based on the determined cadence band, the controlling of the electronic shifting of the bicycle comprising actuating a motor of a derailleur of the bicycle for the electronic shifting of the bicycle when a cadence of the bicycle is outside of the determined cadence band.

2. The method of claim 1, wherein determining the rider engagement status based on the identified sensor data comprises determining whether a rider of the bicycle is in a seated position or a standing position based on the identified sensor data, and
   wherein the determined target cadence is higher when the rider of the bicycle is in the seated position compared to when the rider of the bicycle is in the standing position.

3. The method of claim 2, wherein identifying the sensor data comprises receiving pressure data from one or more pressure sensors at a seat of the bicycle, and
   wherein determining whether the rider of the bicycle is in the seated position or the standing position comprises determining whether the rider of the bicycle is in the seated position or the standing position based on the received pressure data.

4. The method of claim 1, wherein identifying the sensor data comprises receiving torque data from one or more torque sensors of the bicycle,
   wherein determining the rider engagement status comprises:
      determining a power based on the received torque data; and
      comparing the determined power to a predetermined power threshold;
   wherein determining the target cadence based on the determined rider engagement status comprises determining the target cadence based on the comparing.

5. The method of claim 4, wherein the determined target cadence is greater when the determined power is greater than the predetermined power threshold compared to when the determined power is less than the predetermined power threshold.

6. The method of claim 4, wherein determining the rider engagement status further comprises identifying, based on the comparing, a high power state when the determined power is greater than the predetermined power threshold, and
wherein the determined target cadence is a predetermined maximum target cadence when the high power state is identified.

7. The method of claim 6, wherein receiving the torque data from the one or more torque sensors of the bicycle comprises receiving the torque data from the one or more torque sensors of the bicycle at a first time interval,
wherein determining the rider engagement status further comprises:
repeating the determining of the power and the comparing at the first time interval or a second time interval, the second time interval being different than the first time interval; and
after the high power state is identified, identifying an end of the high power state based on the comparing over a predetermined period of time, and
wherein determining the target cadence based on the determined rider engagement status further comprises decreasing the target cadence when the end of the high power state is identified.

8. The method of claim 7, wherein identifying the end of the high power state based on the comparing over the predetermined period of time comprises determining, based on the comparing, the determined power is less than the predetermined power threshold at every first time interval over the predetermined period of time.

9. The method of claim 7, wherein the predetermined period of time is a first predetermined period of time, and
wherein determining the power based on the received torque data comprises determining an average power based on the received torque data from the one or more torque sensors of the bicycle at the first time interval, over a second predetermined period of time.

10. The method of claim 1, wherein the bicycle is an electronic bicycle, and
wherein the controlling of the electronic shifting of the bicycle further comprises actuating an assist motor of the electronic bicycle.

11. The method of claim 1, wherein identifying the sensor data comprises receiving the sensor data from one or more sensors of the bicycle, the one or more sensors of the bicycle comprising an accelerometer, a gyroscope, an inclinometer, a lidar sensor, or any combination thereof,
wherein determining the rider engagement status based on the identified sensor data comprises determining an inclination of the bicycle based on the identified sensor data, and
wherein determining the target cadence based on the determined rider engagement status comprises determining the target cadence based on the determined inclination of the bicycle.

12. The method of claim 11, wherein the determined target cadence is greater when the determined inclination is negative compared to when the determined inclination is positive.

13. The method of claim 11, wherein determining the target cadence based on the determined inclination of the bicycle comprises:

comparing the determined inclination of the bicycle to a lower inclination threshold and an upper inclination threshold; and
determining the target cadence based on the comparisons.

14. The method of claim 13, wherein determining the target cadence based on the comparisons comprises:
identifying the target cadence as a first predetermined target cadence when the determined inclination of the bicycle is less than the lower inclination threshold; and
identifying the target cadence as a second predetermined cadence when the determined inclination of the bicycle is greater than the upper inclination threshold,
the second predetermined target cadence being greater than first predetermined target cadence.

15. The method of claim 14, wherein determining the target cadence based on the comparisons further comprises:
when the determined inclination of the bicycle is greater than the lower inclination threshold and less than the upper inclination threshold, determining the target cadence using the determined inclination of the bicycle as an input to a linear function between the first predetermined target cadence at the lower inclination threshold and the second predetermined target cadence at the upper inclination threshold.

16. The method of claim 11, wherein identifying the sensor data further comprises receiving torque data from one or more torque sensors of the bicycle, and
wherein determining the target cadence based on the rider engagement status further comprises:
determining the modifier for the target cadence based on the determined inclination of the bicycle and the received torque data.

17. The method of claim 16, further comprising determining, by the processor, a torque at a crank arm of the bicycle based on the received torque data,
wherein determining the modifier for the target cadence based on the determined inclination of the bicycle and the received torque data comprises:
determining a first modifier, determining the first modifier comprising:
comparing the determined inclination to a predetermined inclination band, the predetermined inclination band having an upper inclination limit and a lower inclination limit; and
determining the first modifier based on the comparison of the determined inclination to the predetermined inclination band;
determining a second modifier, determining the second modifier comprising:
comparing the determined torque at the crank arm of the bicycle to a predetermined torque band, the predetermined torque band having an upper torque limit and a lower torque limit; and
determining the second modifier based on the comparison of the determined torque at the crank arm of the bicycle to the predetermined torque band; and
determining the modifier for the target cadence based on the determined first modifier and the determined second modifier.

18. The method of claim 17, wherein determining the modifier for the target cadence based on the determined first modifier and the determined second modifier comprises:
determining a total modifier, the determining of the total modifier comprising adding the first modifier and the second modifier;

comparing the total modifier to a predetermined modifier limit;
based on the comparing of the total modifier to the predetermined modifier limit, identifying the modifier as the predetermined modifier limit when the total modifier is greater than the predetermined modifier limit.

19. A controller for a bicycle, the controller comprising:
a memory configured to store a lower inclination limit and an upper inclination limit; and
a processor in communication with the memory, the processor being configured to:
identify sensor data, the sensor data identifying a state of the bicycle;
determine an inclination of the bicycle based on the identified sensor data;
compare the determined inclination to the stored lower inclination limit and the stored upper inclination limit;
determine a target cadence based on the comparisons;
modify the target cadence by adding a target cadence modifier to the target cadence;
determine a cadence band based on the determined target cadence; and
control an electronic shifting of the bicycle based on the determined cadence band, the control of the electronic shifting of the bicycle comprising actuation of a motor of a derailleur of the bicycle for the electronic shifting of the bicycle when a cadence of the bicycle is outside of the determined cadence band.

20. In a non-transitory computer-readable storage medium that stores instructions executable by one or more processors to control electronic shifting of a bicycle, the instructions comprising:
identifying torque sensor data, the torque sensor data identifying a state of the bicycle;
determining a rider engagement status based on the identified torque sensor data;
determining a target cadence based on the determined rider engagement status;
modifying the target cadence by adding a target cadence modifier to the target cadence;
determining a cadence band based on the determined target cadence; and
controlling the electronic shifting of the bicycle based on the determined cadence band, the controlling of the electronic shifting of the bicycle comprising actuating a motor of a derailleur of the bicycle for the electronic shifting of the bicycle when a cadence of the bicycle is outside of the determined cadence band.

* * * * *